US011722449B2

(12) United States Patent
Zhou et al.

(10) Patent No.: US 11,722,449 B2
(45) Date of Patent: Aug. 8, 2023

(54) NOTIFICATION MESSAGE PREVIEW METHOD AND ELECTRONIC DEVICE

(71) Applicant: Huawei Technologies Co., Ltd., Shenzhen (CN)

(72) Inventors: Shanru Zhou, Shenzhen (CN); Kai Qian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 47 days.

(21) Appl. No.: 17/614,247

(22) PCT Filed: May 22, 2020

(86) PCT No.: PCT/CN2020/091689
§ 371 (c)(1),
(2) Date: Nov. 24, 2021

(87) PCT Pub. No.: WO2020/238774
PCT Pub. Date: Dec. 3, 2020

(65) Prior Publication Data
US 2022/0224665 A1   Jul. 14, 2022

(30) Foreign Application Priority Data
May 27, 2019  (CN) .......................... 201910447164.1

(51) Int. Cl.
*H04L 51/224* (2022.01)
*H04L 51/42* (2022.01)
*G06F 3/0488* (2022.01)

(52) U.S. Cl.
CPC ............ *H04L 51/224* (2022.05); *H04L 51/42* (2022.05); *G06F 3/0488* (2013.01)

(58) Field of Classification Search
None
See application file for complete search history.

(56) References Cited

U.S. PATENT DOCUMENTS

| 8,819,268 | B1 | 8/2014 | Sauer |
| 10,019,133 | B1* | 7/2018 | McNeill .................. H04L 51/56 |
| 11,360,634 | B1* | 6/2022 | Chang .................... G06F 3/1454 |
| 11,399,155 | B2* | 7/2022 | Van Os ............ H04N 21/42204 |
| 11,573,693 | B2* | 2/2023 | Senoo ................... G06F 3/0485 |
| 2009/0249247 | A1 | 10/2009 | Tseng et al. |

(Continued)

FOREIGN PATENT DOCUMENTS

| AU | 2009209018 A1 | 8/2009 |
| CN | 103257823 A | 8/2013 |

(Continued)

*Primary Examiner* — Toan H Vu
(74) *Attorney, Agent, or Firm* — Conley Rose, P.C.

(57) ABSTRACT

A notification message preview method includes displaying, by an electronic device, a notification message in the message group on a first card, where the message group includes N notification messages, and other notification messages in the message group are hidden, receiving, by the electronic device, a preset operation from a user on the first card, and displaying, in response to the preset operation; by the electronic device, M notification messages in the message group on a second card, where the M notification messages are M of the N notification messages, and where the M notification messages include the notification message.

20 Claims, 37 Drawing Sheets

(56) References Cited

U.S. PATENT DOCUMENTS

| | | |
|---|---|---|
| 2013/0159941 A1 | 6/2013 | Langlois et al. |
| 2013/0219340 A1 | 8/2013 | Linge |
| 2013/0263009 A1* | 10/2013 | Kim ................... H04L 51/52 715/739 |
| 2013/0346882 A1 | 12/2013 | Shiplacoff et al. |
| 2017/0153777 A1 | 6/2017 | Kim |
| 2017/0185254 A1* | 6/2017 | Zeng ................ G06Q 10/101 |
| 2017/0185268 A1* | 6/2017 | Zeng ................ G06F 3/04842 |
| 2017/0286419 A1 | 10/2017 | Tang et al. |
| 2019/0347181 A1* | 11/2019 | Cranfill ............. G06F 3/04817 |
| 2020/0028815 A1* | 1/2020 | He ...................... H04L 51/52 |
| 2020/0356247 A1* | 11/2020 | Jon .................... G06Q 10/107 |

FOREIGN PATENT DOCUMENTS

| | | | |
|---|---|---|---|
| CN | 103873634 | A | 6/2014 |
| CN | 104412217 | A | 3/2015 |
| CN | 104951193 | A | 9/2015 |
| CN | 105426045 | A | 3/2016 |
| CN | 105677313 | A | 6/2016 |
| CN | 106250144 | A | 12/2016 |
| CN | 106775680 | A | 5/2017 |
| CN | 107122117 | A | 9/2017 |
| CN | 107402760 | A | 11/2017 |
| CN | 107992248 | A | 5/2018 |
| CN | 108427593 | A | 8/2018 |
| CN | 108958805 | A | 12/2018 |
| CN | 109725947 | A | 5/2019 |
| CN | 110351422 | A | 10/2019 |
| EP | 2819387 | A1 | 12/2014 |

\* cited by examiner

Preview status

NOTIFICATION MESSAGE PREVIEW METHOD AND ELECTRONIC DEVICE

CROSS-REFERENCE TO RELATED APPLICATIONS

This is a U.S. National Stage of International Patent Application No. PCT/CN2020/091689 filed on May 22, 2020, which claims priority to Chinese Patent Application No. 201910447164.1 filed on May 27, 2019, both of which are hereby incorporated by reference in their entireties.

This application claims priority to Chinese Patent Application No. 201910447164.1, filed with the China National Intellectual Property Administration on May 27, 2019, and entitled "NOTIFICATION MESSAGE PREVIEW METHOD AND ELECTRONIC DEVICE", which is incorporated herein by reference in its entirety.

TECHNICAL FIELD

This application relates to the field of terminal technologies, and in particular, to a notification message preview method and an electronic device.

BACKGROUND

Currently, a notification panel (notification panel) is set on an electronic device such as a mobile phone, to display a notification message received by an operating system or an application. The mobile phone is used as an example. As shown in FIG. 1(a), the mobile phone may display a status bar (status bar) 101 when displaying applications on a home screen. The status bar 101 may display time, a battery level, signal strength, a Bluetooth status, an operator name, and the like.

If the mobile phone detects that a user drops down the status bar 101, as shown in FIG. 1(b), the mobile phone may display a drop-down menu 102. When a notification message of a system or an application exists in the mobile phone, the mobile phone may display the notification message in a notification panel 103 of the drop-down menu 102. When there are a plurality of notification messages of a same application (for example, a Messages app), still as shown in FIG. 1(b), the mobile phone may display the plurality of notification messages in a form of a message group 104 in the notification panel 103.

Generally, the message group 104 has an expanded state and a collapsed state. As shown in FIG. 1(b), the mobile phone may display the message group 104 in the collapsed state by default, to reduce display space occupied by the notification messages in the notification panel 103. After detecting that the user taps the message group 104, as shown in FIG. 1(c), the mobile phone may display the message group 104 in the expanded state. In the expanded state, the mobile phone may display each notification message in the message group 104 in a form of a card in the notification panel 103.

Because a spacing between adjacent cards is relatively large, when the message group 104 includes a large quantity of notification messages, the user needs to swipe up and down on the notification panel 103 to preview each notification message. In addition, w % ben the user wants to display the expanded message group 104 in the collapsed state, the user needs to return to the top (or the bottom) of the plurality of notification messages and tap a corresponding collapse button. Consequently, user experience in browsing and managing the message group 104 is poor.

SUMMARY

This application provides a notification message preview method and an electronic device, to provide a user with a function of quickly previewing a plurality of notification messages in a message group in a notification panel. This improves management efficiency and usage experience of the user on the message group.

To achieve the foregoing objective, the following technical solutions are used in this application.

According to a first aspect, this application provides a notification message preview method, including: An electronic device displays one notification message in a message group (the message group includes N notification messages, where N is an integer greater than 1) on a first card, where other notification messages in the message group are hidden. In this case, the message group is in a collapsed state. Further, the electronic device may receive a preset operation that is entered by a user to a first card. In this case, in response to the preset operation, the electronic device may display M notification messages (M is an integer less than or equal to N and greater than 1) in the message group on a second card, where the M notification messages are M of the N notification messages, and the M notification messages include the notification message that is displayed when the message group is in the collapsed state. In this case, the message group is in a preview state.

That is, when the message group is in the collapsed state, the electronic device displays only one notification message in the message group on the first card. When the user triggers switching of the message group from the collapsed state to the preview state, the electronic device may display a plurality of notification messages in the message group on one card (for example, the second card), where the plurality of notification messages include the notification message that is displayed when the message group is in the collapsed state. In this way, when viewing the message group in a notification panel, the user may switch the message group to the preview state and quickly preview the plurality of notification messages in the message group without expanding each notification message in the message group to view and manage each notification message. This improves management efficiency and usage experience of the user on the message group.

For example, in response to the preset operation entered by the user, the electronic device may display all the N notification messages in the message group on the second card, and in this case, M=N.

In a possible implementation, the preset operation may be a touch and hold operation. In other words, the user enters the touch and hold operation to the first card, to trigger the electronic device to switch the message group from the collapsed state to the preview state.

In a possible implementation, that the electronic device displays the M notification messages in the message group on the second card includes: The electronic device expands the first card to form the second card, and displays the M notification messages on the second card. In this case, an interface in which the first card is located is a same interface as an interface in which the second card is located.

Alternatively, that the electronic device displays the M notification messages in the message group on the second card includes: The electronic device displays the second card in an interface in which the first card is located, and displays the M notification messages on the second card. In this case, an interface in which the second card is located covers the interface in which the first card is located, and the first card does not disappear.

For example, when the interface in which the second card is located covers the interface in which the first card is located, the electronic device may further blur, mosaic, or hide the interface (namely, the interface in which the first card is located) covered by the second card, to prompt the user to focus on reading each notification message on the second card.

In a possible implementation, the second card includes a content summary of each of the M notification messages. Notification messages of chat messages are used as an example. A content summary of each notification message on the second card may include a name of a contact, a profile picture of a contact, message content, and the like that correspond to the notification message.

In a possible implementation, after the electronic device displays the M notification messages in the message group on the second card, the method further includes: The electronic device detects that a finger of the user leaves a touchscreen after the user performs the touch and hold operation; and the electronic device redisplays the one notification message in the message group on the first card, so that the message group returns to the collapsed state.

In other words, by using one touch and hold operation, the user may trigger the electronic device to switch the message group from the collapsed state to the preview state, and switch the message group from the preview state back to the collapsed state. This simplifies an operation process of switching the message group between the plurality of display states by the user.

In a possible implementation, after the electronic device displays the M notification messages in the message group on the second card, the method further includes: The electronic device detects that a finger of the user does not leave a touchscreen after the user performs the touch and hold operation, and detects that the user enters a first swipe operation to the second card. In this case, the electronic device may display the N notification messages in the message group on the second card in scrolling mode, so that the user can preview each notification message in the message group.

In a possible implementation, after the electronic device displays the M notification messages in the message group on the second card, the method further includes: The electronic device detects that a finger of the user does not leave a touchscreen after the user performs the touch and hold operation, and detects that the user continues to enter a second swipe operation to the second card. In this case, the electronic device may delete the second card and the M notification messages on the second card. That is, when the message group is in the preview state, the user can still delete all the notification messages in the message group by using the message group as a unit.

In a possible implementation, after the electronic device displays the M notification messages in the message group on the second card, the method further includes: The electronic device detects that a finger of the user does not leave a touchscreen after the user performs the touch and hold operation, and detects that the user continues to enter a third swipe operation to the second card. In this case, the electronic device may display a management button for the message group near the second card. The electronic device detects that the user selects the management button. Further, the electronic device may display a management menu, where the management menu includes one or more options of managing the message group, for example, an option of deleting the message group, an option of marking the message group as read, and an option of expanding the message group. That is, in the preview state, the user may manage, by using the management menu, a plurality of notification messages in the message group by using the message group as a unit.

In a possible implementation, after the electronic device displays the M notification messages in the message group on the second card, the method further includes: The electronic device detects that a finger of the user does not leave a touchscreen after the user performs the touch and hold operation, and detects that the user continues to enter a fourth swipe operation to the second card. In this case, the electronic device may display the N notification messages on N cards respectively, and the N cards are in a one-to-one correspondence with the N notification messages. In this case, the message group is in an expanded state.

It can be learned that, when the message group is in the collapsed state, by using the touch and hold operation, the user may trigger the electronic device to switch the message group from the collapsed state to the preview state. Further, the finger of the user does not need to leave the screen of the mobile phone, and may continue to enter a swipe operation to trigger the electronic device to switch the message group from the preview state to the expanded state. In this case, for the user, in an operation process from touching the screen to leaving the screen by the finger, the user may control the mobile phone to switch the message group between the three display states: the collapsed state, the preview state, and the expanded state. This simplifies an operation process of switching the message group between the plurality of display states by the user, and improves user experience.

In a possible implementation, detailed content of a corresponding notification message is displayed on each of the N cards. Notification messages of chat messages are used as an example. The detailed content may include receiving time, a name of a contact, a profile picture of a contact, message content, and the like that correspond to a corresponding notification message.

In a possible implementation, after the electronic device displays the N notification messages on the N cards respectively, the method further includes: The electronic device detects that the user enters a first swipe operation to a third card in the N cards, and further, the electronic device deletes the third card and a notification message on the third card. Alternatively, the electronic device detects that the user enters a second swipe operation to a third card in the N cards, and further, the electronic device displays, near the third card, a management button for a notification message on the third card. That is, in the expanded state, the user may manage each notification message in the message group by using a card as a unit.

In a possible implementation, after the electronic device displays a first notification message in the message group on the first card, the method further includes: The electronic device detects that the user enters the first swipe operation to the first card, and further, the electronic device deletes the first card and the message group. Alternatively, the electronic device deletes that the user enters the second swipe operation to the first card, and further, the electronic device displays the management button for the message group near the first card. That is, in the collapsed state, the user may manage the N notification messages in the message group by using the message group as a unit.

For example, the N notification messages in the message group may be notification messages from a same application.

According to a second aspect, this application provides an electronic device, including a touchscreen, one or more processors, one or more memories, and one or more computer programs. The processors are coupled to both the touchscreen and the memories. The one or more computer programs are stored in the memories. When the electronic device runs, the processor executes the one or more computer programs stored in the memories, so that the electronic device is enabled to perform the notification message preview method according to any one of the implementations of first aspect.

According to a third aspect, this application provides a chip system, where the chip system includes at least one processor and at least one interface circuit. The interface circuit is configured to read instructions stored in a memory, and send the instructions to the processor. When the instructions are executed by the processor, the electronic device is enabled to perform the notification message preview method according to any one of the implementations of the first aspect.

According to a fourth aspect, this application provides a computer storage medium, including computer instructions. When the computer instructions are run on an electronic device, the electronic device is enabled to perform the notification message preview method according to any one of the implementations of the first aspect.

According to a fifth aspect, this application provides a computer program product. When the computer program product is run on an electronic device, the electronic device is enabled to perform the notification message preview method according to any one of the implementations of the first aspect.

It may be understood that the electronic device according to the second aspect, the chip system according to the third aspect, the computer storage medium according to the fourth aspect, and the computer program product according to the fifth aspect are all configured to perform the corresponding method provided above. Therefore, for beneficial effects that can be achieved, refer to the beneficial effects in the foregoing corresponding method. Details are not described herein again.

DESCRIPTION OF EMBODIMENTS

The following describes implementations of embodiments in detail with reference to the accompanying drawings.

The embodiments of this application provide a notification message preview method, which may be applied to electronic devices such as a mobile phone, a tablet computer, a notebook computer, an ultra-mobile personal computer (ultra-mobile personal computer, UMPC), a handheld computer, a netbook, and a personal digital assistant (personal digital assistant, PDA), a wearable electronic device, or a virtual reality device. This is not limited in the embodiments of this application.

Figure 1A:
FIG. 1(a) to FIG. 1(c) are application scenarios of displaying a notification message in the conventional technology.
Figure 1B:
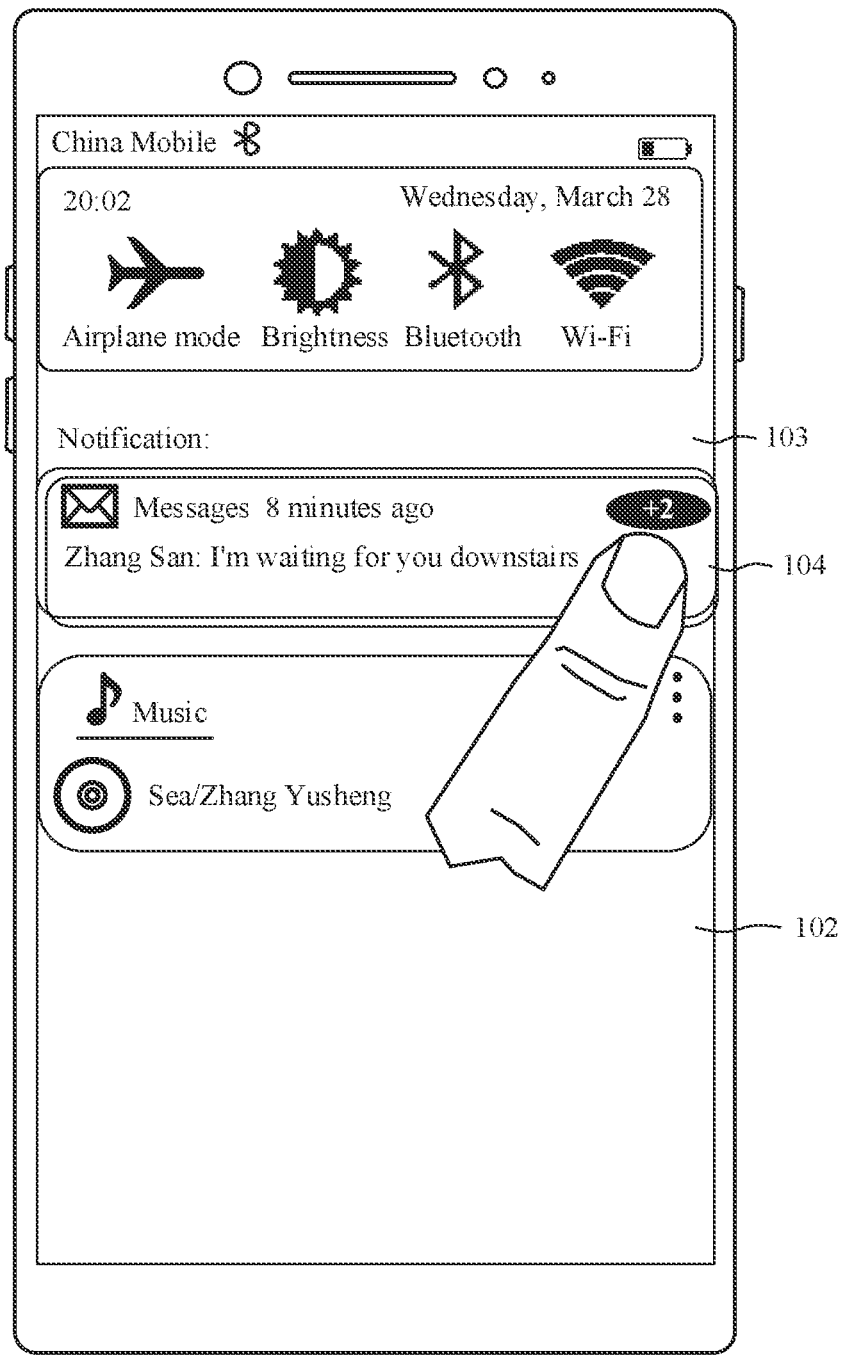
Figure 1C:
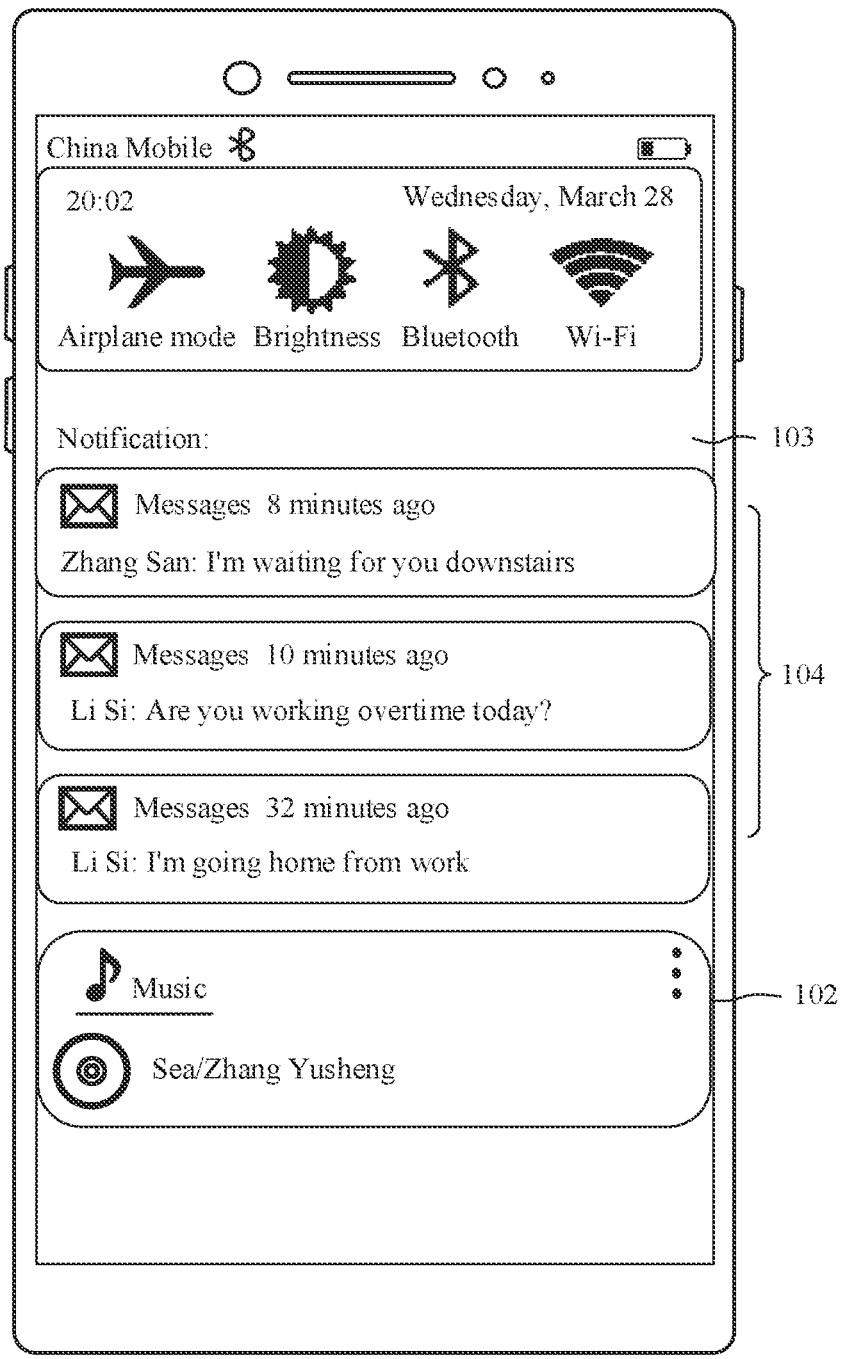
Figure 2:
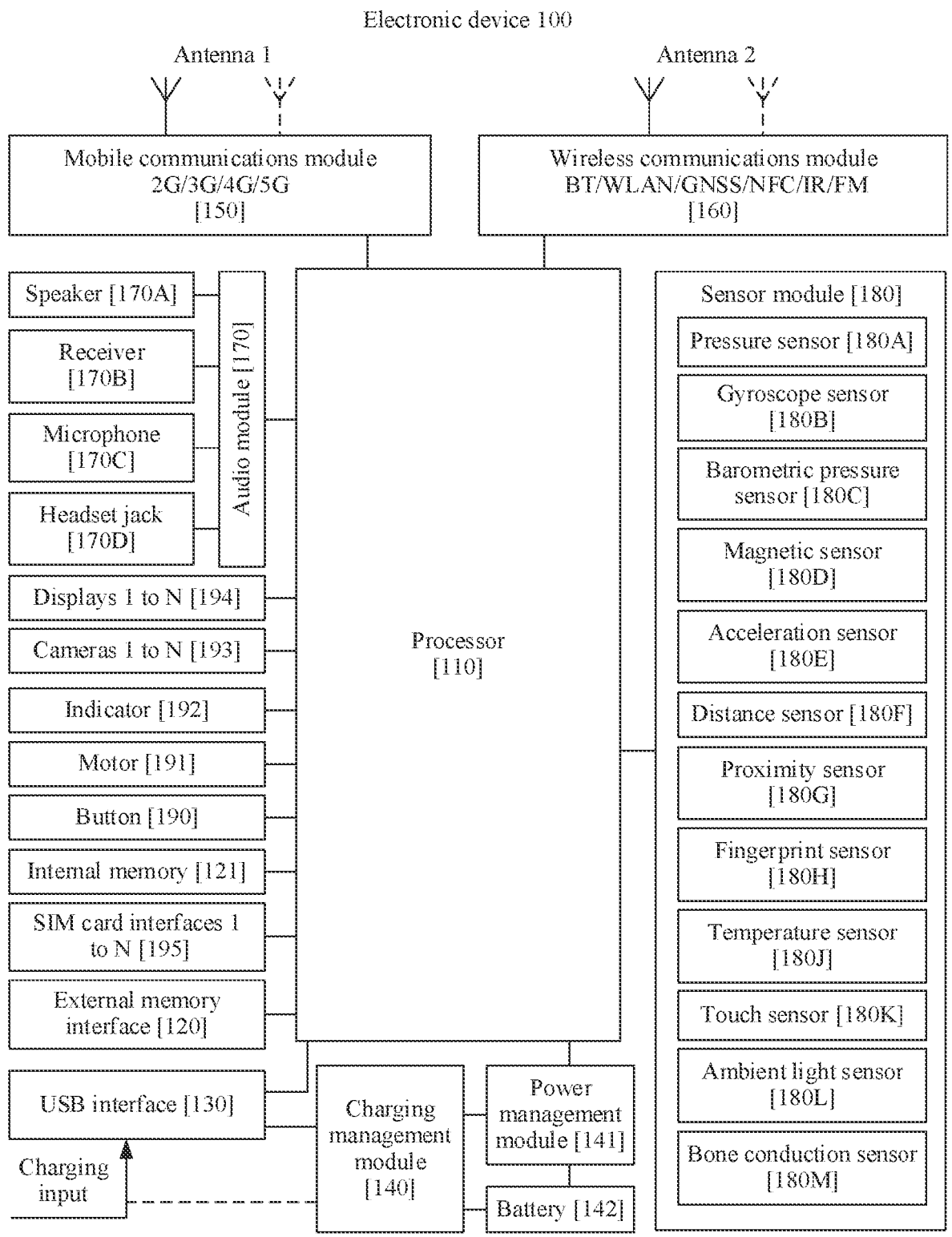
FIG. 2 is a schematic diagram 1 of a structure of an electronic device according to an embodiment of this application.

For example, FIG. 2 is a schematic diagram of a structure of an electronic device 100).

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like.

It may be understood that an example structure in the embodiments of the present invention does not constitute a specific limitation on the electronic device 100. In other embodiments of this application, the electronic device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may generate an operation control signal based on instruction operation code and a time sequence signal, to complete control of instruction fetching and instruction execution.

A memory may further be disposed in the processor 110, and is configured to store instructions and data. In some embodiments, the memory in the processor 110 is a cache memory. The memory may store instructions or data that has just been used or is cyclically used by the processor 110. If the processor 110 needs to use the instructions or the data again, the processor 110 may directly invoke the instructions or the data from the memory. This avoids repeated access and reduces waiting time of the processor 110. Therefore, system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface. MIPI), a general-purpose input/output (general-purpose input/output, GPIO) interface, a subscriber identification module (subscriber identity module. SIM) interface, a universal serial bus (universal serial bus, USB) interface, and/or the like.

The charging management module 140 is configured to receive a charging input from a charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect to the battery 142, the charging management module 140, and the processor 110. The power management module 141 receives an input of the battery 142 and/or an input of the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may further be multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a solution that is for wireless communication including 2G/3G/4G/5G and the like and that is applied to the electronic device 100. The mobile communications module 150 may include one or more filters, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transfer the electromagnetic wave to the modem processor for demodulation. The mobile communications module 150 may further amplify a signal modulated by the modem processor, and convert an amplified signal into an electromagnetic wave through the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low frequency baseband signal. Then, the demodulator transfers the low-frequency baseband signal obtained through demodulation to the baseband processor for processing. The low-frequency baseband signal is processed by the baseband processor, and is then transferred to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communication solution that includes wireless local area networks (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like and that is applied to the electronic device 100. The wireless communications module 160 may be one or more components integrating one or more communications processor modules. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave through the antenna 2 for radiation.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE). BT, a GNSS, a WLAN, NFC, FM, an IR technology, and/or the like. The GNSS may include a global positioning system (global positioning system, GPS), a global navigation satellite system (global navigation satellite system. GLONASS), a Beidou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 implements a display function through the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute a program instruction to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, quantum dot light emitting diodes (quantum dot light emitting diodes, QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is turned on, and light is transmitted to a photosensitive element of the camera through a lens. An optical signal is converted into an electrical signal, the photosensitive element of the camera transmits the electrical signal to the ISP for processing, and the electrical signal is converted into an image that can be seen. The ISP may further optimize an algorithm for noise, brightness, and complexion of an image. The ISP may further optimize parameters such as exposure and a color temperature of a shooting scenario. In some embodiments, the ISP may be disposed in the camera 193.

The camera 193 is configured to capture a static image or a video. An optical image of an object is generated through the lens, and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts the optical signal into the electrical signal, and then transmits the electrical signal to the ISP to convert the electrical signal into a digital image signal. The ISP outputs the digital image signal to the DSP for processing. The DSP converts the digital image signal into a standard image signal in a format such as RGB or YUV. In some embodiments, the electronic device 100 may include one or N cameras 193, where N is a positive integer greater than 1.

The digital signal processor is configured to process a digital signal. In addition to the digital image signal, the digital signal processor may further process another digital signal. For example, when the electronic device 100 selects a frequency, the digital signal processor is configured to perform Fourier transformation and the like on frequency energy.

The video codec is configured to compress or decompress a digital video. The electronic device 100 may support one or more video codecs. Therefore, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network. NN) computing processor that rapidly processes input information by referring to a structure of a biological neural network, for example, by referring to a transfer mode between human brain neurons, and can further perform self-learning continuously. The NPU can implement applications such as intelligent cognition of the electronic device 100, such as image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and a video are stored in the external storage card.

The internal memory 121 may be configured to store one or more computer programs, where the one or more computer programs include instructions. The processor 110 may run the instructions stored in the internal memory 121, so that the electronic device 100 performs the notification message preview method provided in some embodiments of this application, various function applications, data processing, and the like. The internal memory 121 may include a program storage area and a data storage area. The program storage area may store an operating system. The program storage area may further store one or more applications (for example, gallery and contacts), and the like. The data storage area may store data (for example, a photo and a contact) created during use of the electronic device 101, and the like. In addition, the internal memory 121 may include a high-speed random access memory, or may include a nonvolatile memory, for example, one or more magnetic disk storage devices, a flash memory device, or a universal flash storage (universal flash storage, UFS). In some other embodiments, the processor 110 runs the instructions stored in the internal memory 121 and/or the instructions stored in the memory disposed in the processor, so that the electronic device 100 performs the notification message preview method provided in the embodiments of this application, various function applications, and data processing.

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal output, and is further configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 100 may listen to music or answer a hands-free call by using the speaker 170A.

The receiver 170B, also referred to as an "earpiece", is configured to convert an audio electrical signal into a sound signal. When the electronic device 100 answers a call or receives voice information, the receiver 170B may be placed near a human ear to listen to a voice.

The microphone 170C, also referred to as a "mike" or a "voice transmitter", is configured to convert a sound signal into an electrical signal. When making a call or sending a voice message, the user may make a sound near the microphone 170C by the mouth of the user, to input the sound signal to the microphone 170C. One or more microphones 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, reduce a noise, identify a sound source, implement a directional recording function, and the like.

The headset jack 170D is configured to connect to a wired headset. The headset jack 170D may be the USB interface 130, or a 3.5 mm open mobile terminal platform (open mobile terminal platform, OMTP) standard interface, or a cellular telecommunications industry association of the USA (cellular telecommunications industry association of the USA, CTIA) standard interface.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

In addition, the electronic device may further include one or more components such as a button 190, a motor 191, an indicator 192, and a SIM card interface 195. This is not limited in the embodiments of this application.

A software system of the electronic device 100 may use a layered architecture, an event-driven architecture, a microkernel architecture, a micro service architecture, or a cloud architecture. In the embodiments of this application, an Android system with a layered architecture is used as an example to describe a software structure of the electronic device 100.

Figure 3:
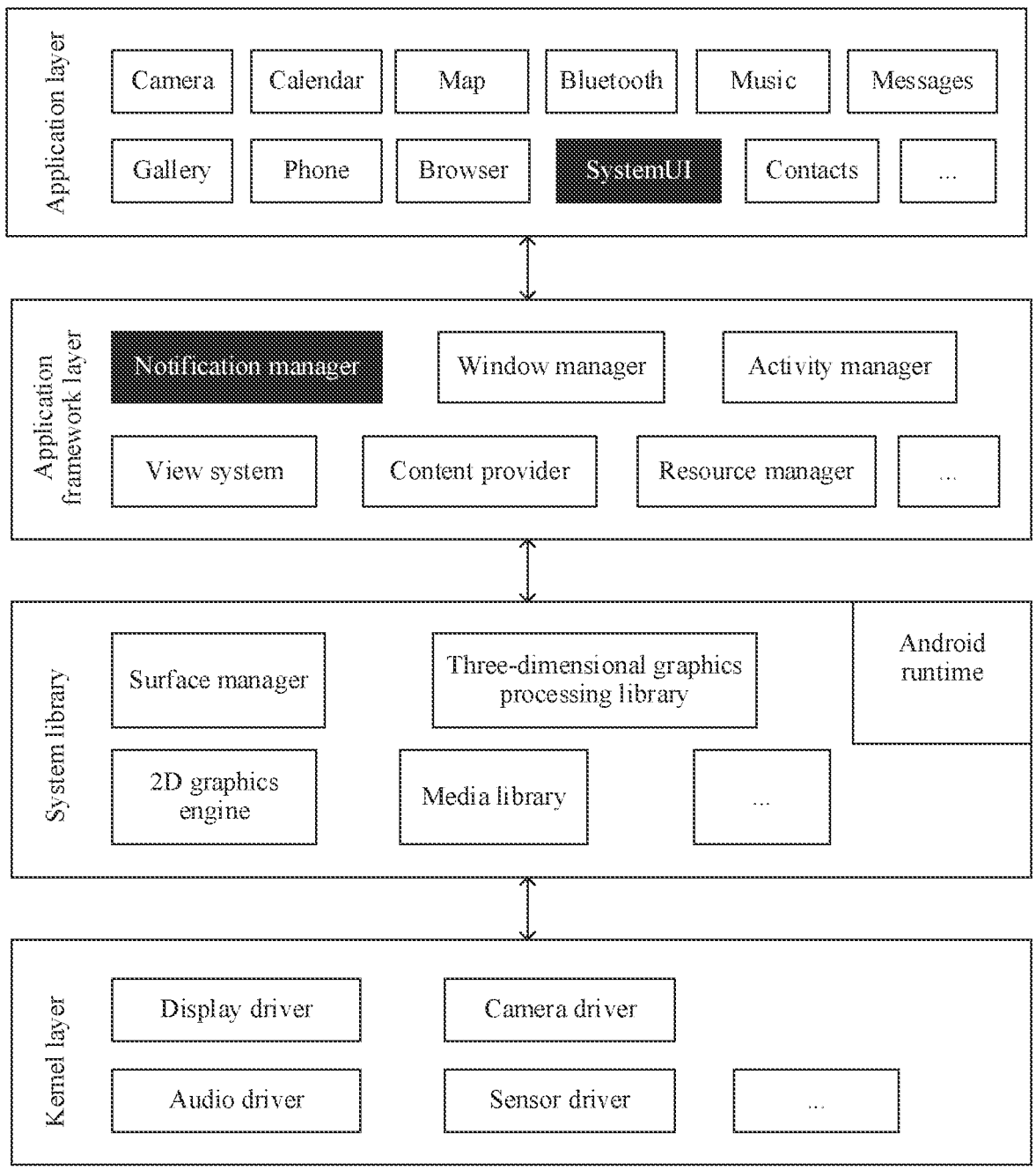
FIG. 3 is a schematic diagram of an architecture of an operating system in an electronic device according to an embodiment of this application.

FIG. 3 is a block diagram of the software structure of the electronic device 100 according to an embodiment of this application.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and a system library, and a kernel layer from top to bottom.

1. Application Layer

The application layer may include a series of applications.

As shown in FIG. 3, the applications may include applications (application, APP) such as Phone, Contacts, Camera, Gallery, Calendar, Map, Navigation, Bluetooth, Music, Video, and Messages.

In the embodiments of this application, the application package may further include systemUI, which is a core application of the Android system Generally, the systemUI runs in the Android system as an application. That is, an APK file is generated when the systemUI module is compiled. A source code path of the systemUI is frameworks/base/packages/systemUI/, and an installation path is system/priv-app/-systemUI.

The systemUI can be used to manage a plurality of modules displayed on the electronic device, such as a status bar (status bar), a navigation bar (navigation bar), a notification panel (notification panel), recents (a recent task interface), and keyguard (a lock screen).

2. Application Framework Layer

The application framework layer provides an application programming interface (application programming interface, API) and a programming framework for the applications at the application layer. The application program framework layer includes some predefined functions.

The modules in the systemUI typically reside at the application framework layer as services (services) when running. For example, when the lock screen is displayed, the systemUI can start a keyguard service to display a notification message on the lock screen. When the notification panel is displayed, the systemUI can start a systembars service to display a notification message in the notification panel.

As shown in FIG. 3, the application framework layer may include a notification manager (notification manager). The notification manager enables an application to display notification information in the status bar or the notification panel. The notification information may convey a notification-type message, and may automatically disappear after being displayed for a short period of time. For example, the notification manager is configured to notify download completion, provide a message notification, and the like.

A WeChat app is used as an example. If the WeChat app running in the background receives a chat message 1 sent by a contact A, a notification object (notification object) may be first instantiated. For example, the notification object may include information such as a profile picture of the contact A, a name of the contact A, and content and receiving time of the chat message 1. The information is used as content that needs to be displayed in a notification message of the chat message 1. Further, the WeChat app may invoke a related interface (for example, a notify( ) interface) of the notification manager to transfer the created notification object as a parameter to the notification manager.

In addition, a notification panel service in the systemUI can listen for changes to notification objects in the notification manager. When a new notification object is detected in the notification manager, the notification panel service may generate a notification message corresponding to the chat message 1. Further, the notification panel service may display the notification message in the notification panel or the lock screen by using the system application: systemUI.

In the embodiments of this application, the systemUI may display a plurality of notification messages in a form of a message group. The message group may include the plurality of notification messages. For example, a plurality of notification messages from a same application may be set as a message group. For another example, a plurality of notification messages of a same type (for example, an advertisement type or a social type) may be set as a message group.

For example, the message group may be in three display states: a collapsed state, a preview state, and an expanded state.

Figure 4A:
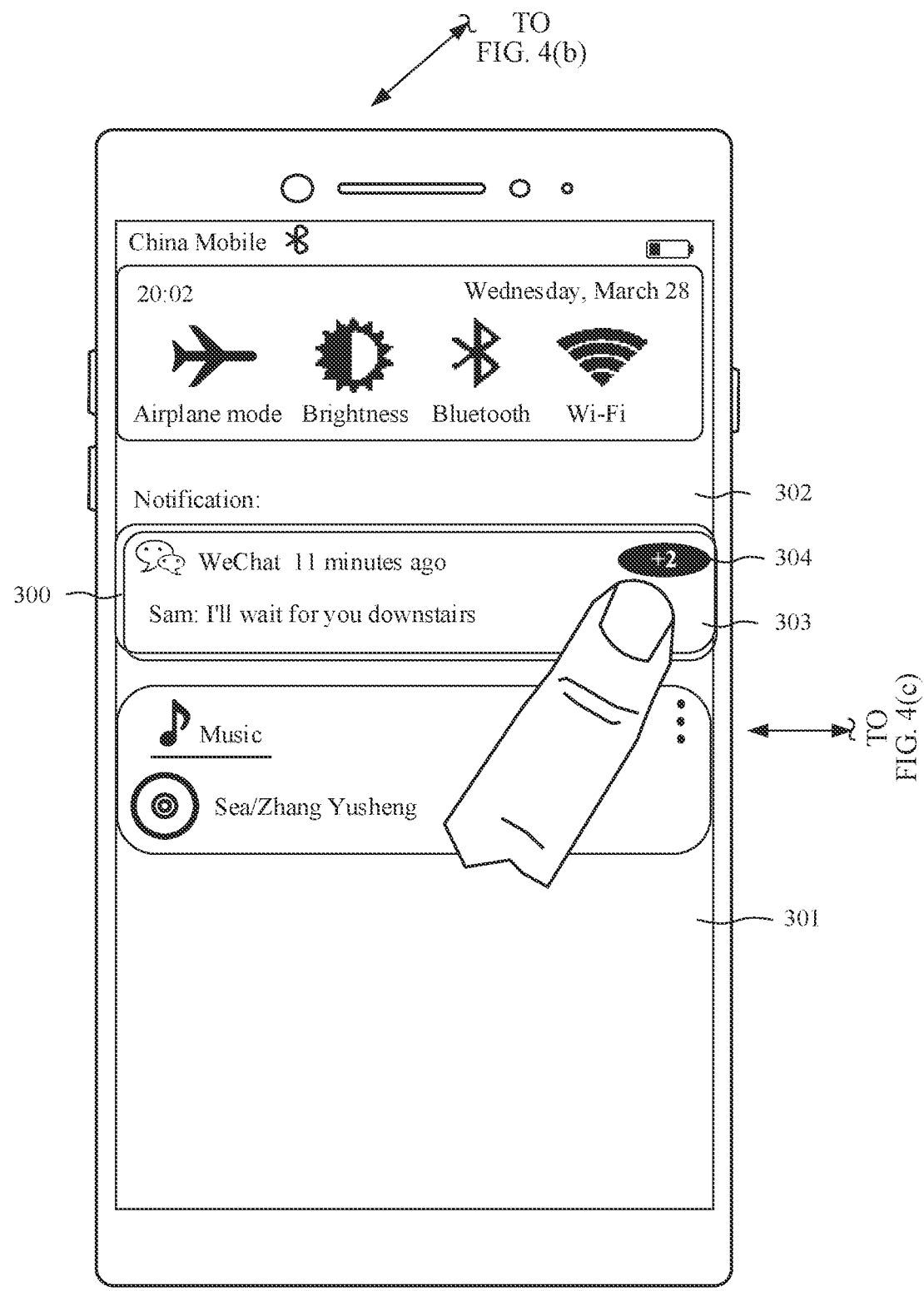
FIG. 4(a) to FIG. 4(c) are scenario diagrams 1 of a notification message preview method according to an embodiment of this application.

As shown in FIG. 4(a), after detecting an operation performed by the user to open a notification panel, the systemUI may display a first interface 301. The first interface 301 includes a notification panel 302, the notification panel 302 includes a message group 303 of a WeChat app, and the message group 303 includes three notification messages from the WeChat app. In this case, the message group 303 is in a collapsed state. The message group 303 in the collapsed state means that only one notification message in the message group 303 is displayed on a card 300, and other notification messages in the message group 303 are hidden. For example, still as shown in FIG. 4(a), the card 300 includes only a notification message that is recently received by the WeChat app from a contact Sam. Certainly, an unread indicator 304 may be further set in the message group 303, and the unread indicator 304 may indicate that there are two hidden notification messages in the message group 303.

Figure 4B:
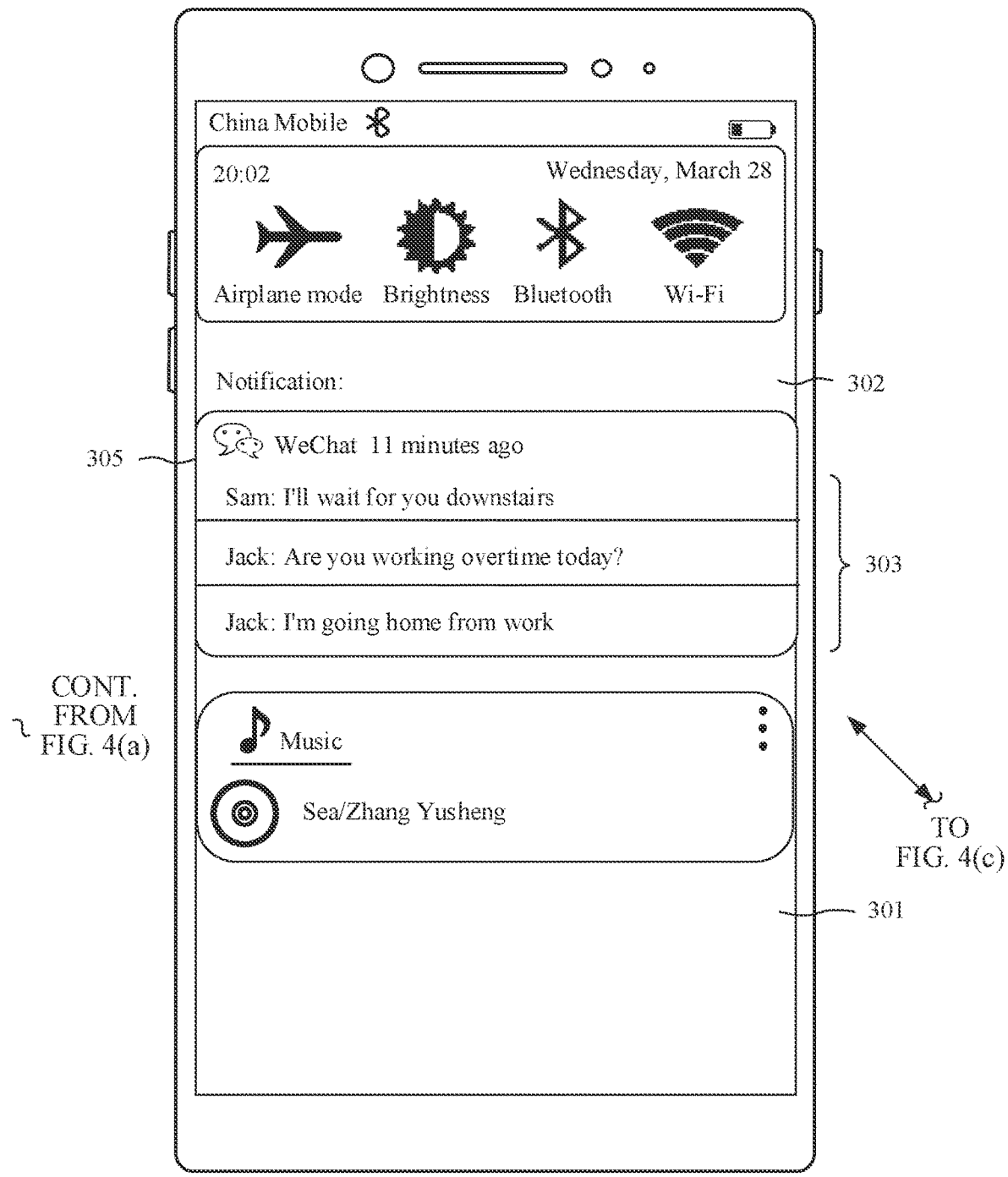

If it is detected that the user enters a first operation to the message group 303, as shown in FIG. 4(b), the systemUI may display the message group 303 in a preview state. The message group 303 in the preview state means that a plurality of notification messages in the message group 303 are displayed on one card (for example, a card 305), and the card 305 includes the notification message displayed by the systemUI in the collapsed state. Still as shown in FIG. 4(b), the card 305 may include one notification message that is received by the WeChat app from the contact Sam and two notification messages that are received by the WeChat app from a contact Jack. The user may quickly view the plurality of notification messages in the message group 303 on the card 305, and the user may centrally manage the plurality of notification messages in the message group 303 on the card 305. For example, the systemUI may display, on the card 305, names of contacts, profile pictures of contacts, message content summaries, and the like corresponding to the notification messages in the message group 303.

Figure 4C:
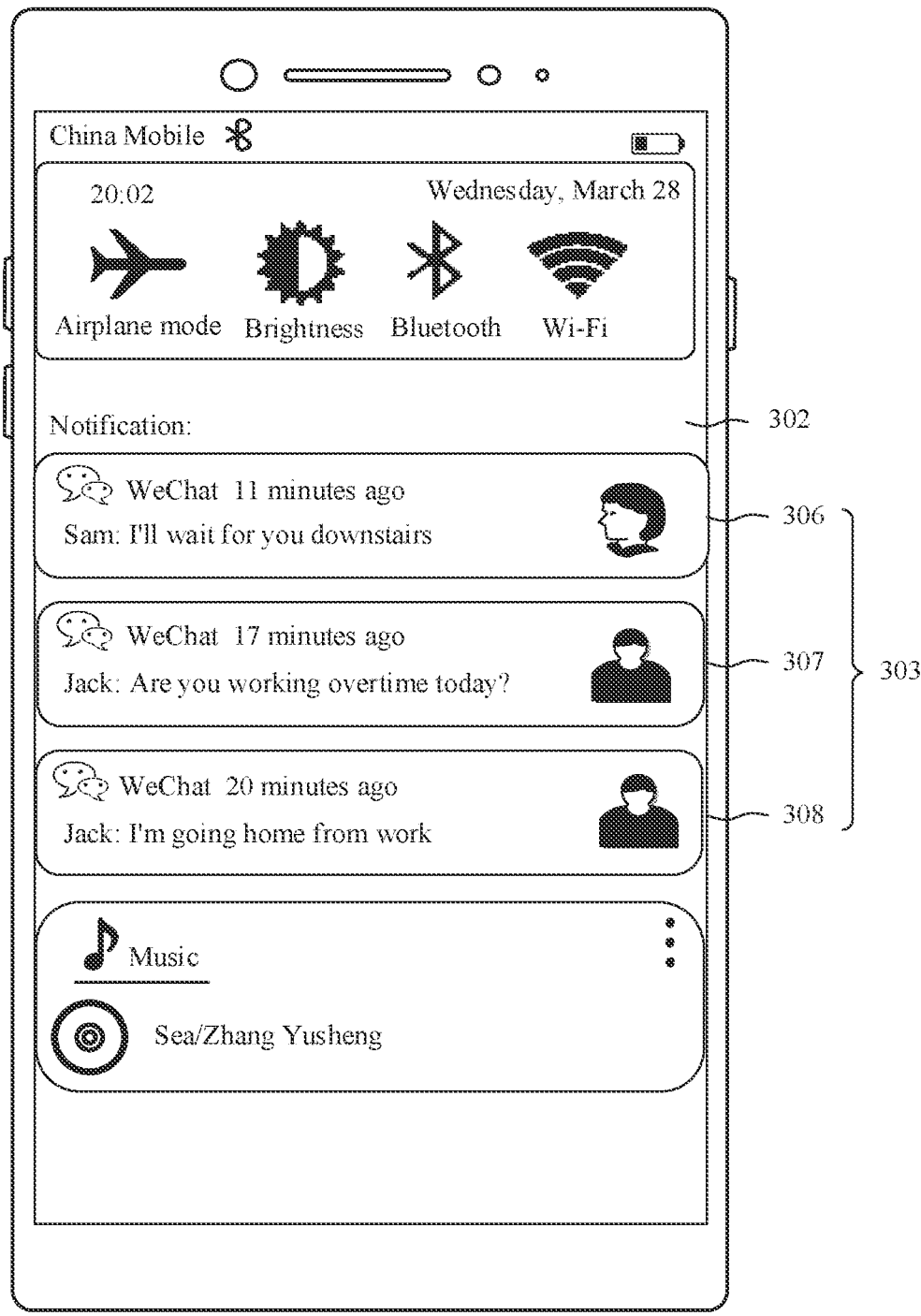

When the message group 303 is displayed in the preview state, if it is detected that the user enters a second operation to the message group 303, as shown in FIG. 4(c), the systemUI may display the message group 303 in the expanded state. The message group 303 in the expanded state means that each notification message in the message group 303 is correspondingly displayed on one card. Still as shown in FIG. 4(c), after the message group 303 of the WeChat app is expanded, the systemUI may display a card 306 to a card 308, where the card 306 includes one notification message from the contact Sam, the card 307 includes one notification message from the contact Jack, and the card 308 includes the other notification message from the contact Jack. The user may manage a corresponding notification message on each card, for example, expand the notification message, delete the notification message, or mark the notification message as read. In addition, detailed content such as receiving time of the corresponding notification message may be further displayed on each card.

It should be noted that a display state of the message group 303 may be randomly switched between the collapsed state, the preview state, and the expanded state.

For example, when the message group 303 is displayed in the expanded state, the user may further enter a third operation to switch the message group 303 from the expanded state to the collapsed state. Alternatively, when the message group 303 is displayed in the expanded state, the user may further enter a fourth operation to switch the message group 303 from the expanded state to the preview state. Alternatively, when the message group 303 is displayed in the preview state, the user may enter a fifth operation to switch the message group 303 from the preview state to the collapsed state. Alternatively, when the message group 303 is displayed in the collapsed state, the user may enter a sixth operation to switch the message group 303 from the collapsed state to the expanded state.

That is, when notification messages of a message group type are displayed, a new display state, namely, the preview state, is added between the collapsed state and the expanded state in the embodiments of this application. When the message group is in the collapsed state, the electronic device displays a content summary of only one notification message in the message group to the user. Alternatively, when the message group is in the preview state, the electronic device may display content summaries of the notification messages in the message group to the user by using the message group as a unit. Alternatively, when the message group is in the expanded state, the electronic device may display detailed content of the notification messages to the user by using each notification message as a unit.

In this way, when viewing the message group in the notification panel, the user may switch the message group to the preview state and quickly preview the plurality of notification messages in the message group without expanding each notification message in the message group to view and manage each notification message. This improves management efficiency and usage experience of the user on the message group.

Certainly, the application framework layer may further include an activity manager, a window manager, a content provider, a view system, a resource manager, an input method manager, and the like.

The activity manager can be configured to manage a life cycle of each application. An application usually runs in an operating system in a form of an activity. The activity manager can schedule an activity process of an application to manage the life cycle of each application. The window manager is configured to manage a window program. The window manager may obtain a size of a display, determine whether there is a status bar, lock a screen, take a screenshot, and the like. The content provider is configured to store and obtain data, and enable the data to be accessed by an application. The data may include a video, an image, audio, calls that are made and answered, a browsing history and a bookmark, a phone book, and the like. The view system includes visual controls such as a control for displaying a text and a control for displaying a picture. The view system may be configured to construct an application. The display interface may include one or more views. For example, a display interface including an SMS message notification icon may include a view for displaying a text and a view for displaying a picture. The resource manager provides various resources for an application, such as a localized character string, an icon, a picture, a layout file, and a video file.

3. Android Runtime and System Library

The Android runtime includes a kernel library and a virtual machine. The Android runtime is responsible for scheduling and management of the Android system.

The kernel library includes two parts: a function that needs to be invoked by the Java language and a kernel library of Android.

The application program layer and the application program framework layer run on the virtual machine. The virtual machine executes a Java file at the application program layer and the application program framework layer as a binary file. The virtual machine is configured to perform functions such as object life cycle management, stack management, thread management, security and exception management, and garbage collection.

The system library may include a plurality of function modules, for example, a surface manager (surface manager), media libraries (Media Libraries), a three-dimensional graphics processing library (for example, OpenGL ES), and a 2D graphics engine (for example, SGL).

The surface manager is configured to manage a display subsystem, and provide fusion of 2D and 3D layers for a plurality of applications. The media library supports playback and recording in a plurality of commonly used audio and video formats, static image files, and the like. The media library may support a plurality of audio and video coding formats such as MPEG-4, H.264, MP3, AAC, AMR, JPG, and PNG. The three-dimensional graphics processing library is configured to implement three-dimensional graphics drawing, image rendering, composition, layer processing, and the like. The 2D graphics engine is a drawing engine for 2D drawing.

4. Kernel Layer

The kernel layer is a layer between hardware and software. The kernel layer includes at least a display driver, a camera driver, an audio driver, a sensor driver, and the like. This is not limited in the embodiments of this application.

For example, a mobile phone is an electronic device. The following describes in detail the notification message preview method provided in the embodiments of this application with reference to the accompanying drawings.

Figure 5A:
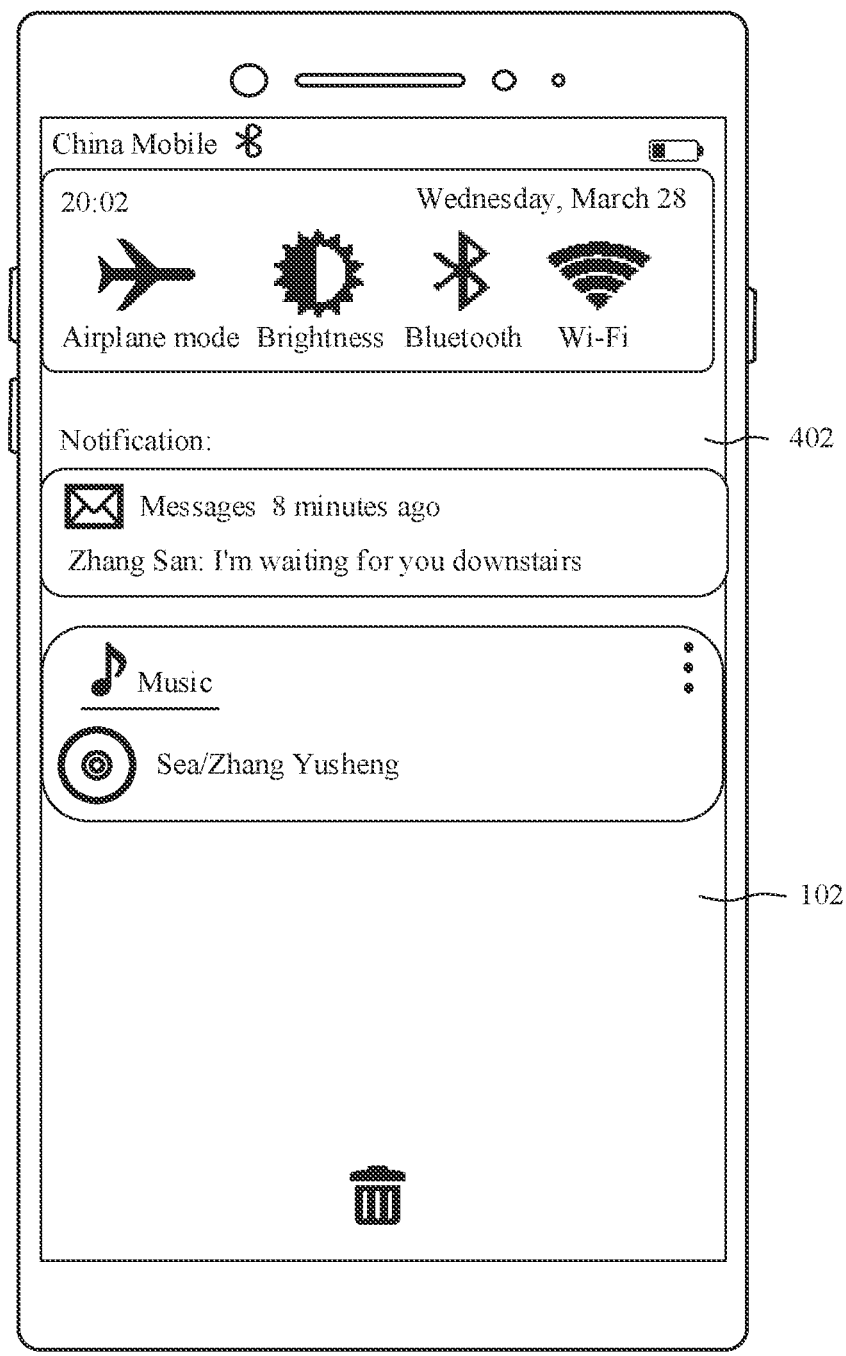
FIG. 5(a) to FIG. 5(c) are scenario diagrams 2 of a notification message preview method according to an embodiment of this application.
Figure 5B:
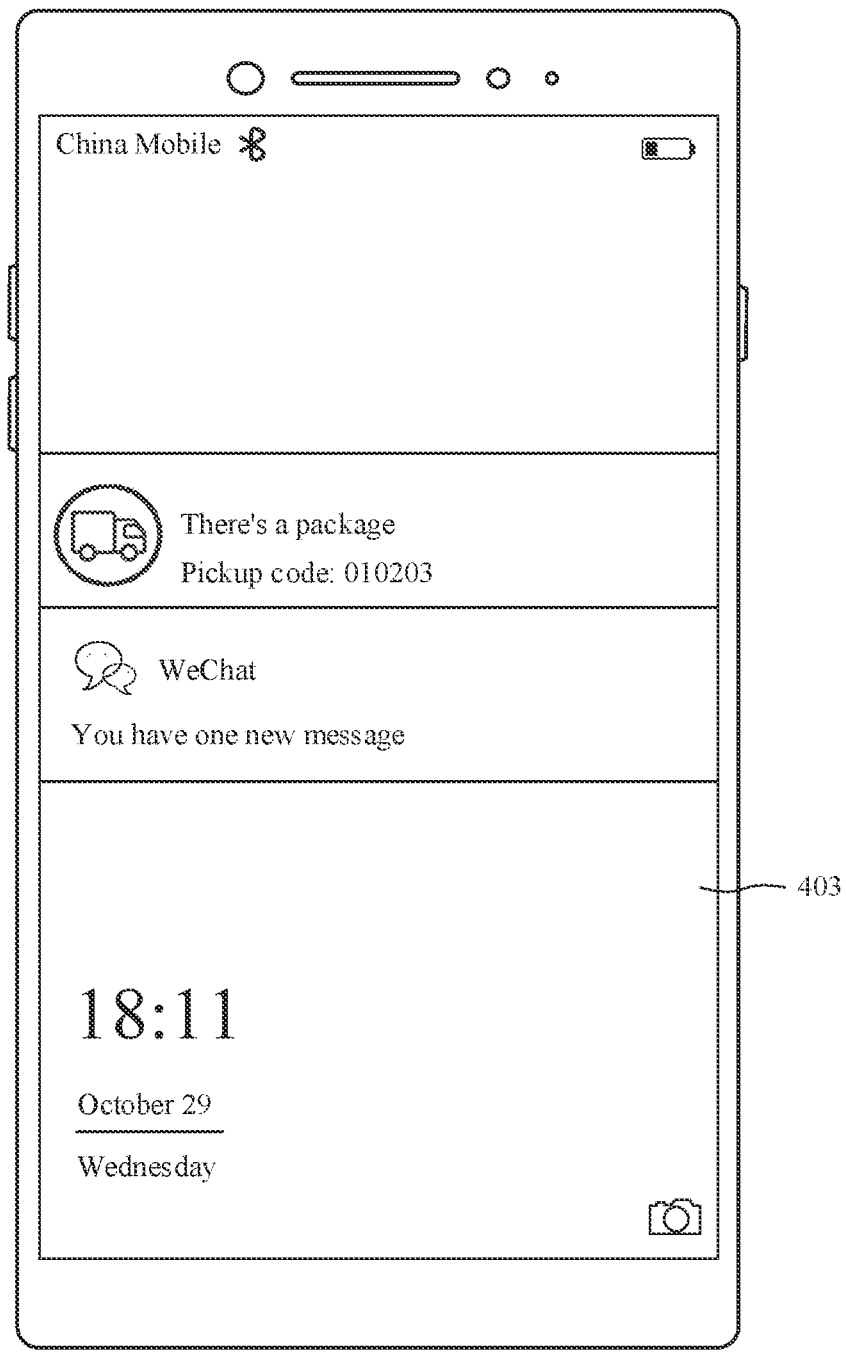
Figure 5C:
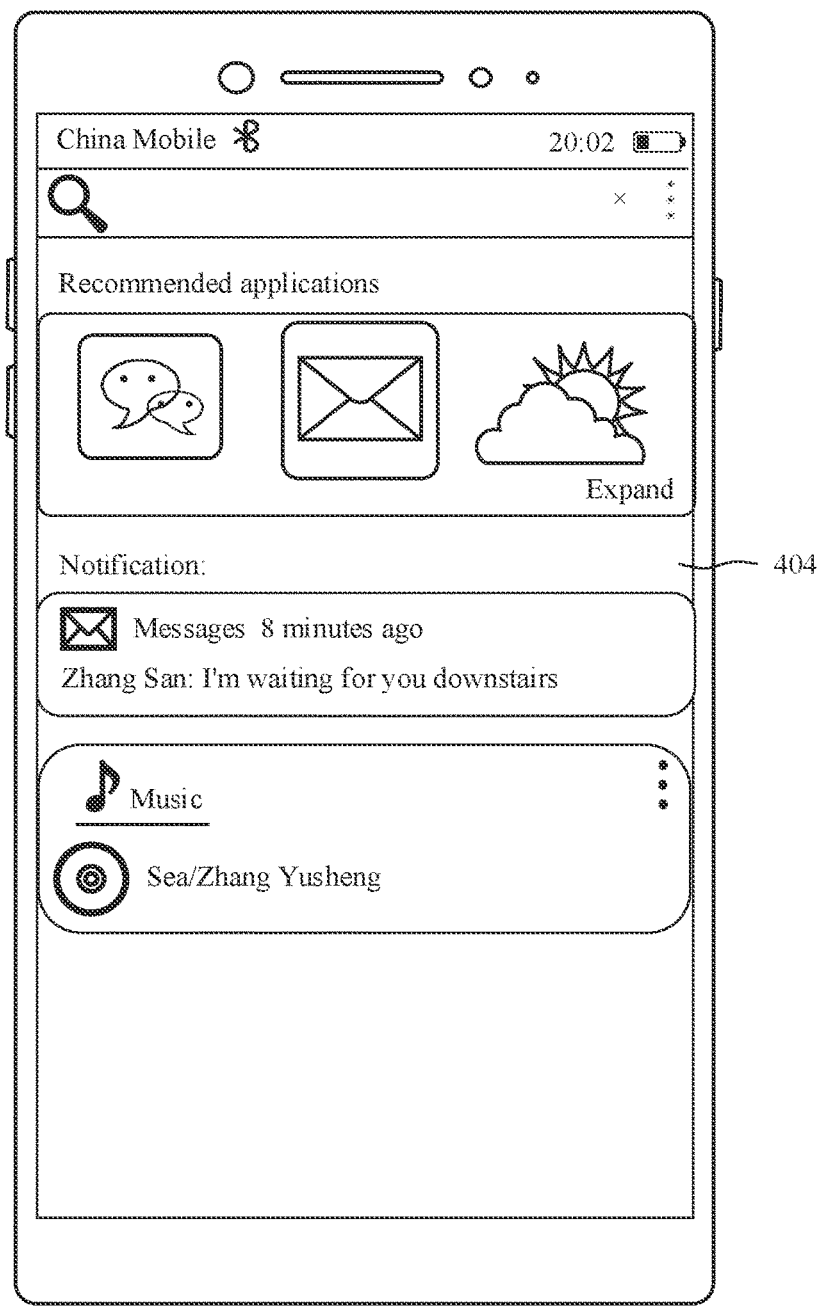

Generally, there may be a plurality of entrances in the mobile phone that can display a notification message. For example, as shown in FIG. 5(a), the mobile phone may set a notification panel 402 (which may also be referred to as a message center, a notification panel, or the like) in a drop-down menu 401. The mobile phone may display notification messages of applications in the notification panel 402. For another example, as shown in FIG. 5(b), the mobile phone may display the notification messages of the applications on a lock screen 403. Alternatively, as shown in FIG. 5(c), the mobile phone may further display the notification messages of the applications in a menu 404 on a leftmost screen. Display positions of the notification messages are not limited in the embodiments of this application.

The notification messages displayed in the notification panel 402 are used as examples. When the mobile phone receives the plurality of notification messages, the plurality of notification messages may be displayed in the notification panel 402 in a form of a message group. For example, the mobile phone may set a plurality of notification messages of a same application as a message group. Alternatively, the mobile phone may set notification messages of a same type as a message group. For example, the mobile phone may set all notification messages of unread chat messages as a message group, and set all notification messages of version updates as another message group.

Figure 6:
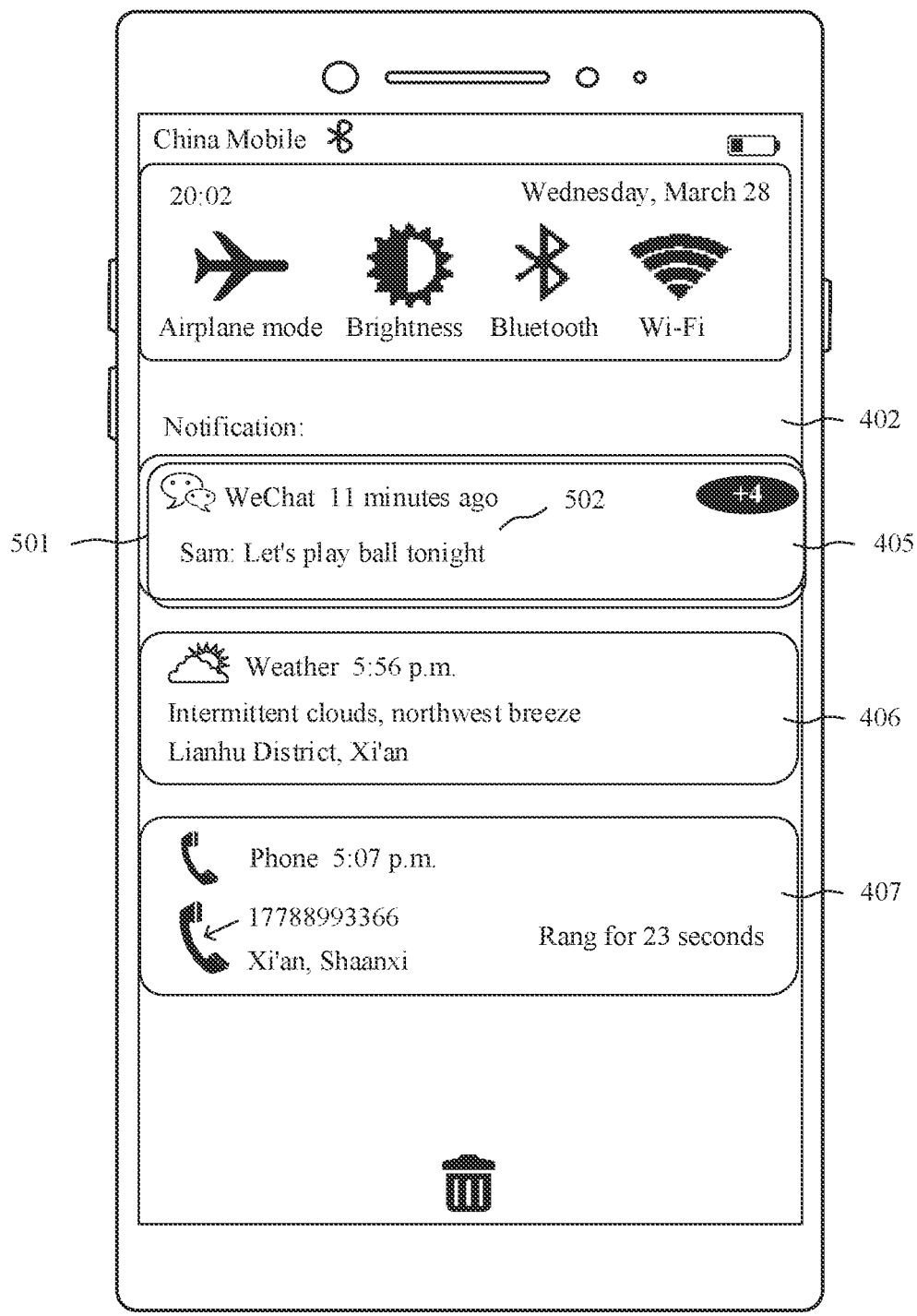
FIG. 6 is a scenario diagram 3 of a notification message preview method according to an embodiment of this application.

As shown in FIG. 6, after receiving a plurality of notification messages from a WeChat app, the mobile phone may display a message group 405 of the WeChat app in the notification panel 402. In addition, the notification panel 402 further includes a notification message 406 of a Weather app and a notification message 407 of a Phone app.

In the embodiments of this application, when the message group 405 is displayed, the message group 405 may be in three display states: a collapsed state, a preview state, or an expanded state. The mobile phone can switch the message group between the three display states.

Still as shown in FIG. 6, the mobile phone may display the message group 405 in the collapsed state by default when the user opens the notification panel 402. When the message group 405 is in the collapsed state, the mobile phone may display only one notification message in the message group 405 on a card 501. For example, the mobile phone may display, on the card 501, a notification message 502 recently received by the WeChat app from a contact (for example, Sam). The mobile phone may further display a profile picture of the contact Sam corresponding to the notification message 502, receiving time of the notification message 502, and the like. In addition, the mobile phone may further display, on the card 501, a quantity of remaining notification messages that are hidden in the message group 405. For example, in addition to the notification message 502 from the contact Sam, the message group 405 shown in FIG. 6 further includes four remaining notification messages that are hidden.

It should be noted that, when displaying the notification message 502 on the card 501, the mobile phone may display, in the notification message 502, all chat content sent by the contact Sam, or some chat content sent by the contact Sam. For example, if the chat content sent by the contact Sam in the WeChat app is "Let's play ball tonight. I'll wait for you on the basketball court", the mobile phone may display the first 10 characters of the chat content (that is, "Let's play ball tonight") in the notification message 502.

When the message group 405 is in the collapsed state, the user may manage the message group 405 by using the message group 405 as a unit.

Figure 7A:
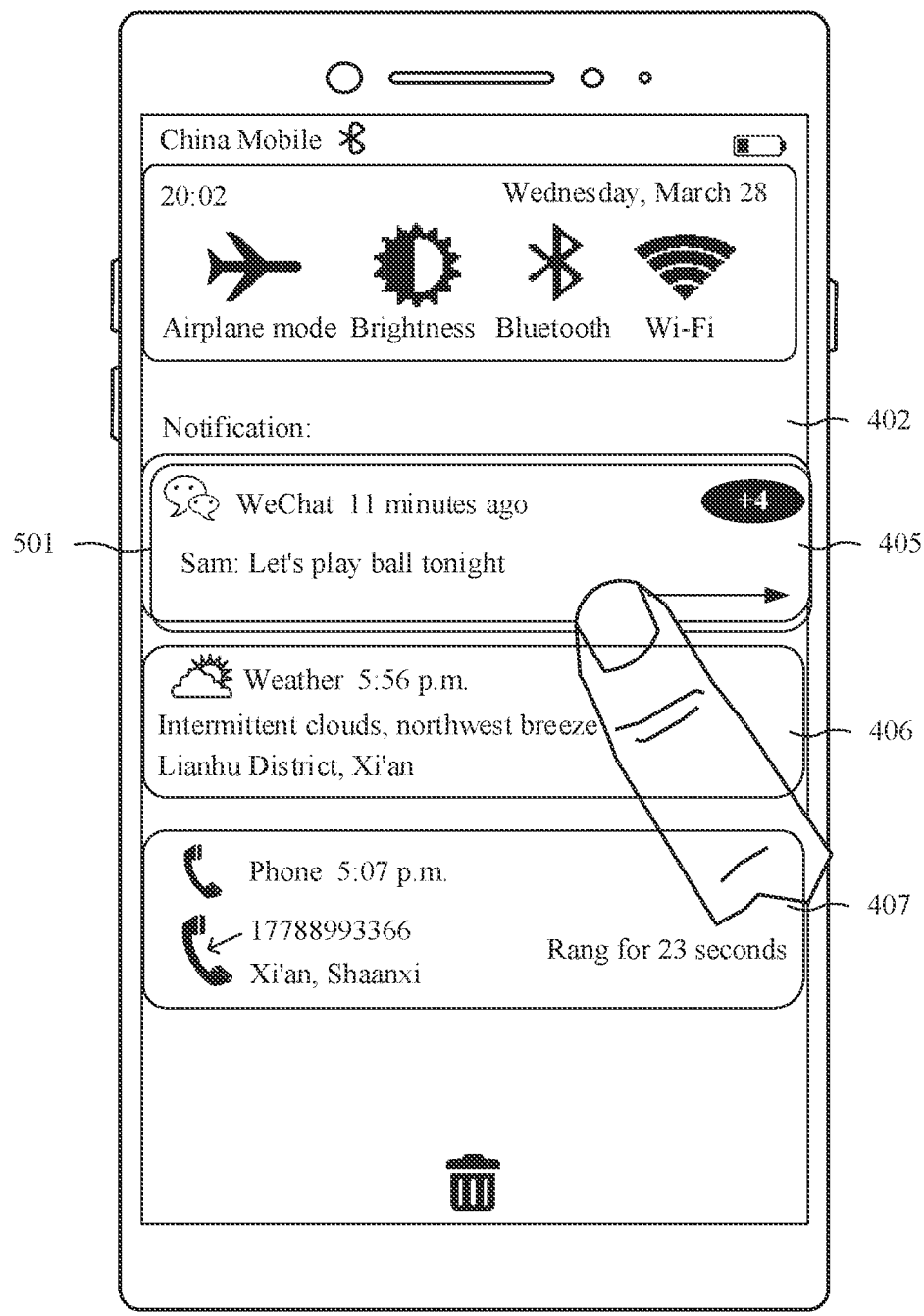
FIG. 7(a) and FIG. 7(b) are scenario diagrams 4 of a notification message preview method according to an embodiment of this application.
Figure 7B:
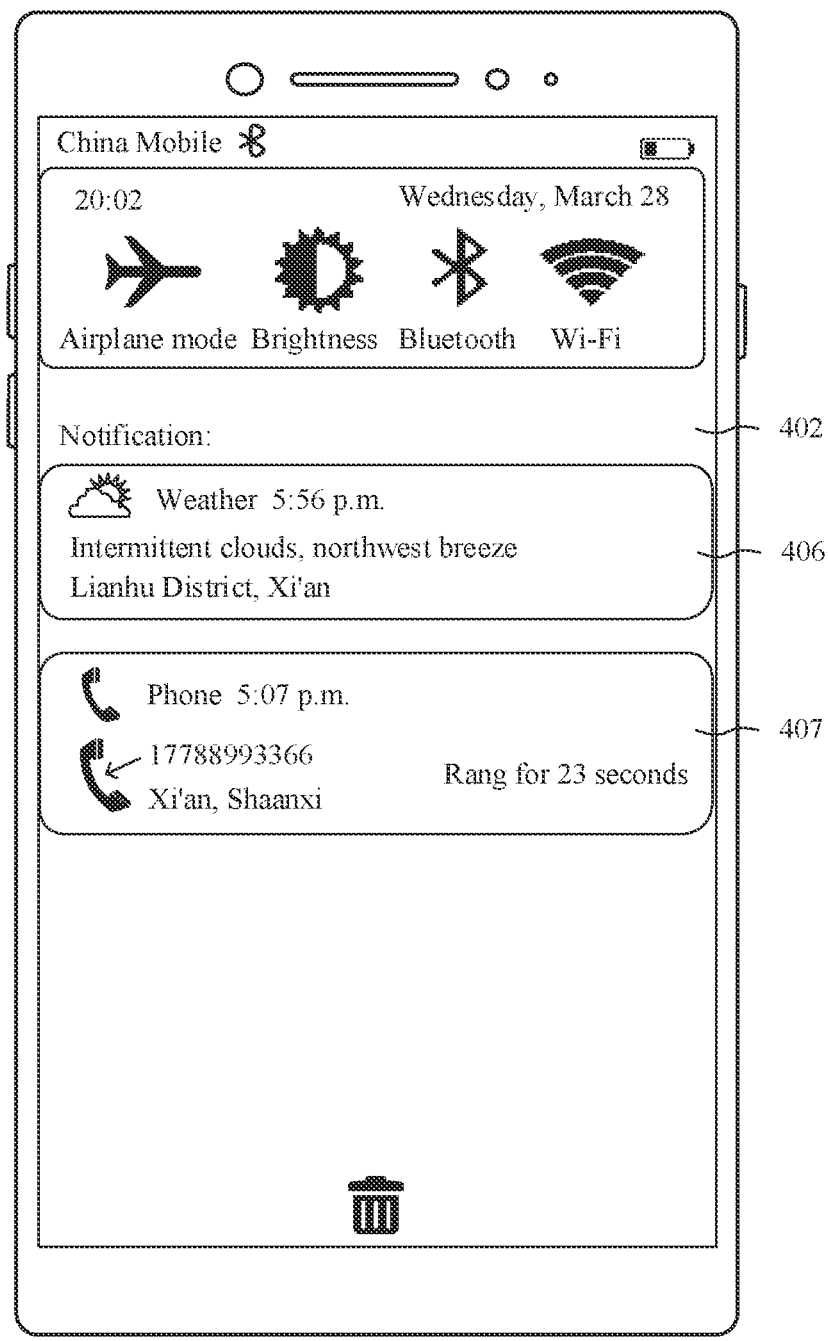

For example, as shown in FIG. 7(a), the user may enter a swipe right operation to the card 501 on which the message group 405 is located. As shown in FIG. 7(b), after detecting the swipe right operation performed by the user on the card 501, the mobile phone may delete the message group 405 in the notification panel 402. In this case, the message group 405 is no longer displayed in the notification panel 402. It may be understood that the user deletes only five notification messages from the WeChat app in the notification panel 402, and the user may still find five unread chat messages corresponding to the five notification messages in the WeChat app.

Figure 8A:
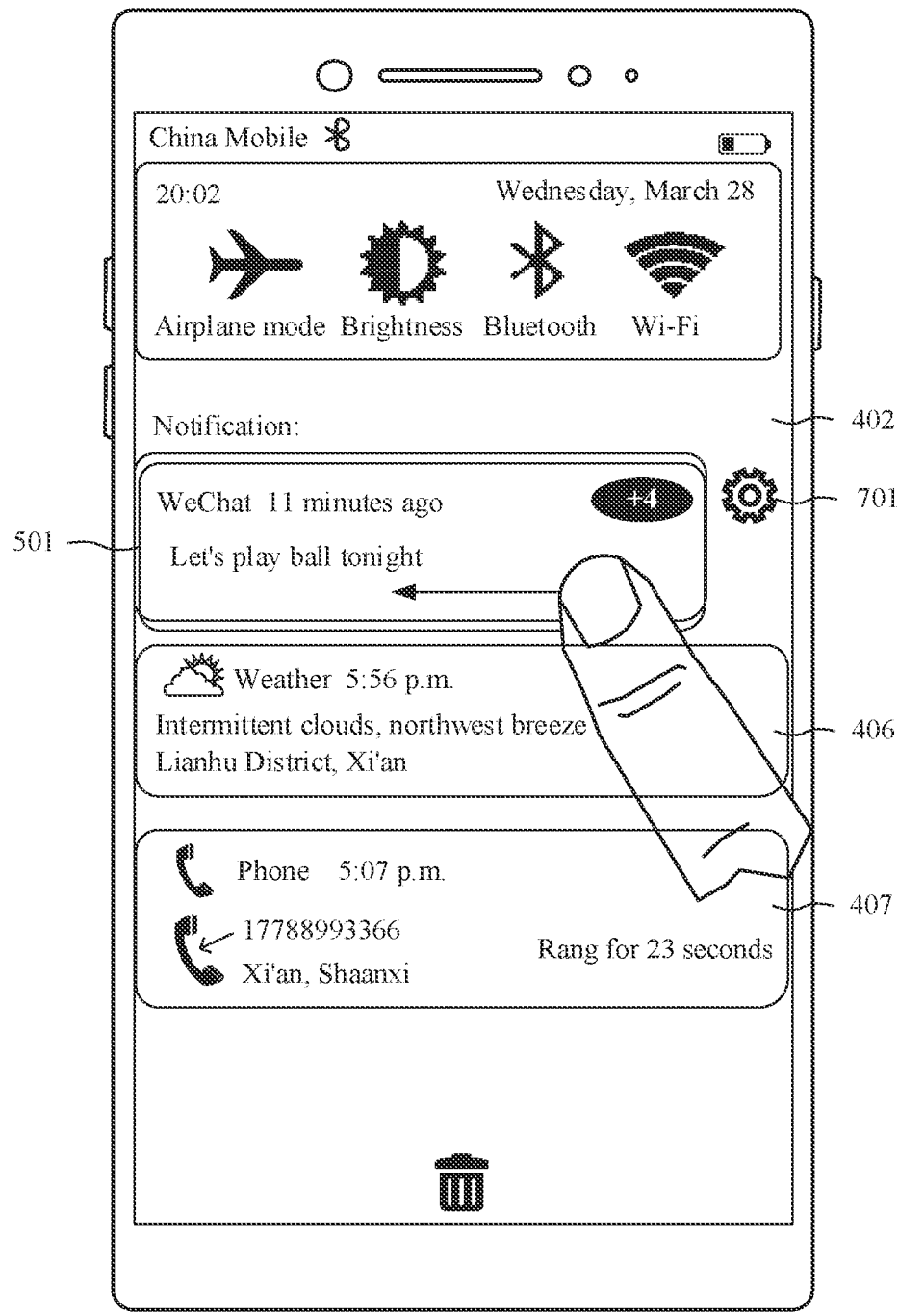
FIG. 8(a) and FIG. 8(b) are scenario diagrams 5 of a notification message preview method according to an embodiment of this application.
Figure 8B:
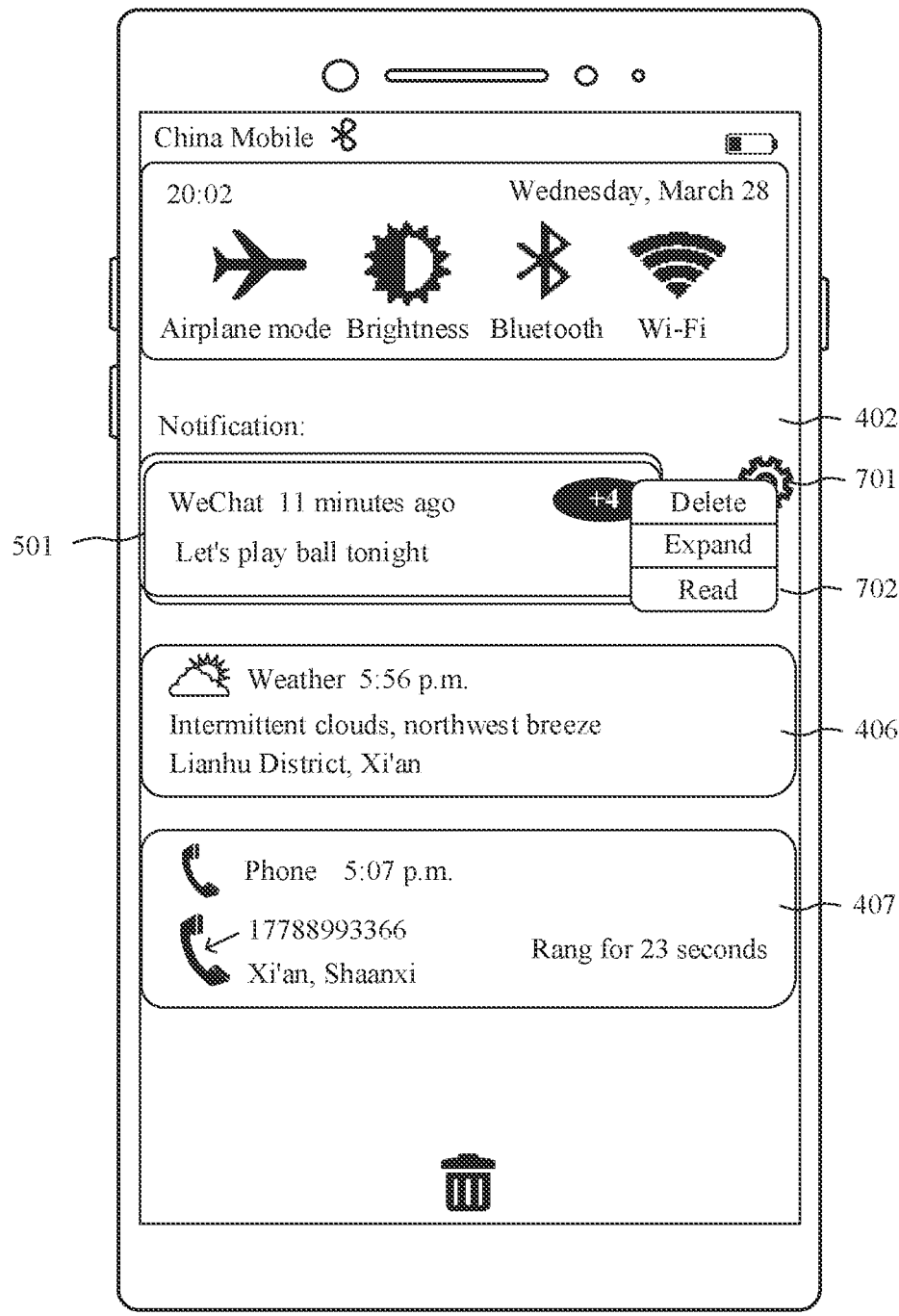

For another example, as shown in FIG. 8(*a*), the user may enter a swipe left operation to the card 501 on which the message group 405 is located. After detecting the swipe left operation performed by the user on the card 501, the mobile phone may display a management button 701. If the mobile phone detects that the user selects the management button 701, as shown in FIG. 8(*b*), the mobile phone may display a management menu 702 of the message group 405. The management menu 702 may include an option of deleting the message group 405, an option of marking the message group 405 as read, an option of expanding the message group 405, and the like. That is, in the collapsed state, the user may manage, by using the management menu 702, the plurality of notification messages in the message group 405 by using the message group 405 as a unit.

Certainly, if the mobile phone detects that the user taps the management button 701, the mobile phone may also display a setting interface for notification management in a Settings app. The user may manually set, in the setting interface, options related to the notification messages, such as display positions, display modes, and display rules of the notification messages in the notification panel.

In some embodiments, when the message group 405 is in the collapsed state, in response to a first operation performed by the user on the message group 405, the mobile phone may switch the message group 405 from the collapsed state to the preview state. For example, the first operation may be any gesture such as a touch and hold operation, a double-tap operation, a press operation, or a knock operation. This is not limited in the embodiments of this application.

Figure 9A:
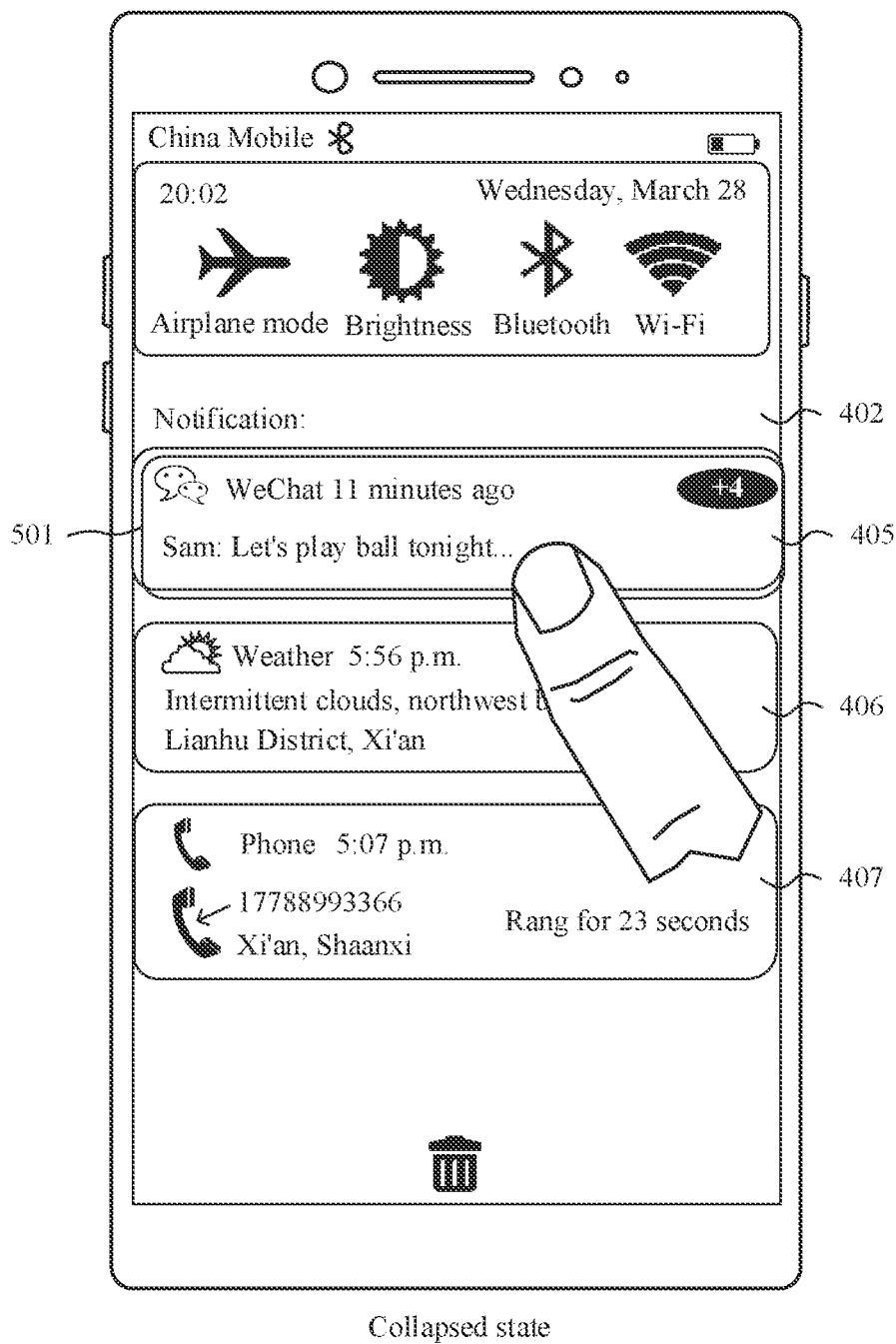
FIG. 9(a) and FIG. 9(b) are scenario diagrams 6 of a notification message preview method according to an embodiment of this application.
Figure 9B:
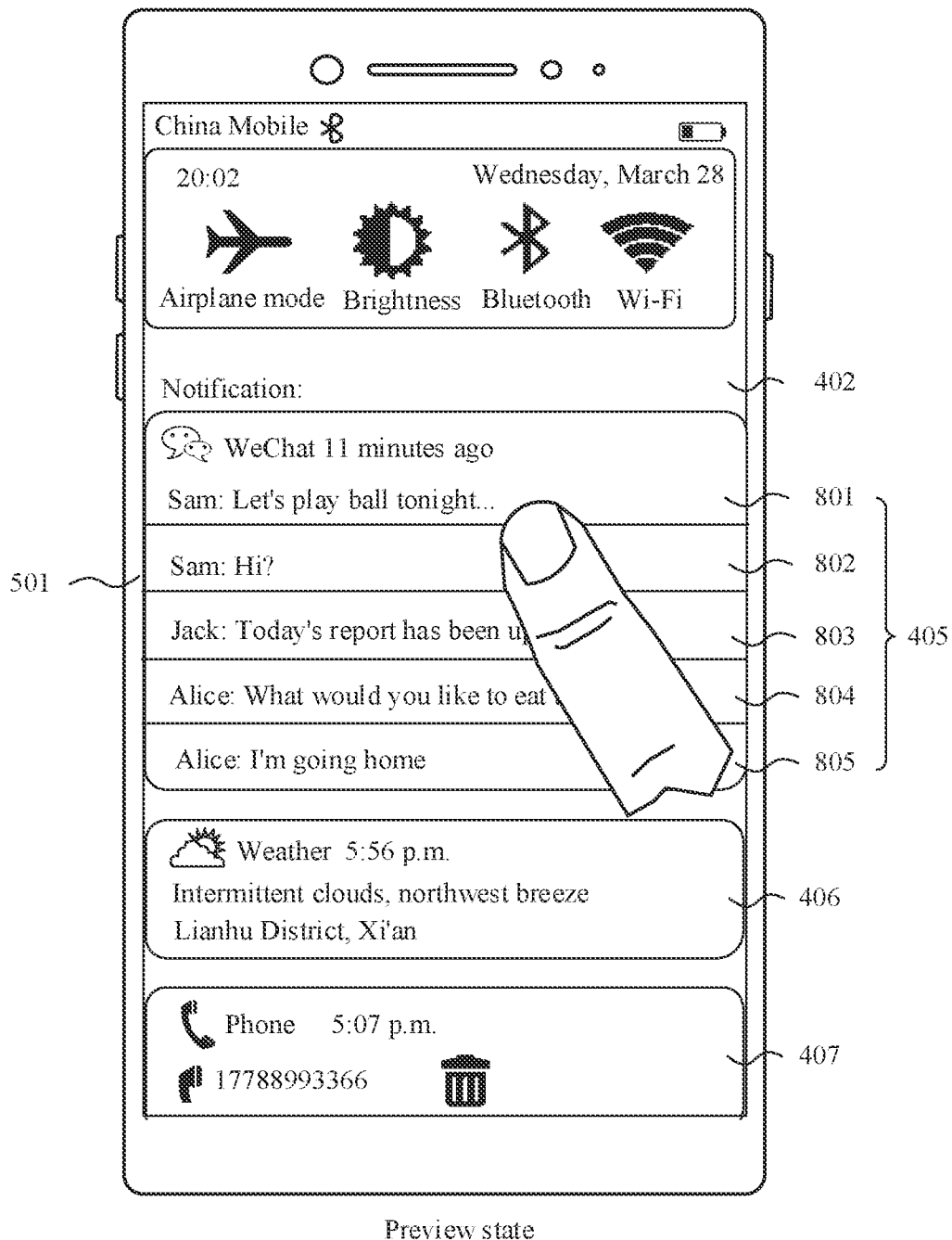

For example, the first operation is the touch and hold operation. As shown in FIG. 9(*a*), the user may enter the touch and hold operation to the message group 405 (namely, the card 501) in the collapsed state. After the mobile phone detects the touch and hold operation performed by the user on the card 501, as shown in FIG. 9(*b*), the mobile phone may expand the card 501 in the notification panel 402, and centrally display the plurality of notification messages in the message group 405 on the expanded card 501. The expanded card 501 includes the notification message 502 displayed when the card 501 is collapsed. For example, the mobile phone may display, on the expanded card 501, all notification messages (for example, a notification message 801 to a notification message 805) in the message group 405 from the WeChat app. In this case, the message group 405 is in the preview state. Still as shown in FIG. 9(*b*), when expanding the card 501, the mobile phone may simultaneously move a notification message 406 of the Weather app and a notification message 407 of the Phone app downwards. That is, in the preview state, the card 501 on which the message group 405 is located and cards on which other notification messages are located may be located in a same interface.

When the message group 405 is in the preview state, still as shown in FIG. 9(*b*), the user may preview, on the card 501, the notification message 801 and the notification message 802 from the contact Sam, the notification message 803 from the contact Jack, and the notification message 804 and the notification message 805 from a contact Alice, namely, the five notification messages included in the message group 405. For example, the mobile phone may display the five notification messages on the card 501 from earliest to latest. Certainly, the mobile phone may alternatively sort the five notification messages based on a category of the contacts or content of the notification messages. This is not limited in the embodiments of this application.

For example, when the message group 405 is in the preview state, to save display space, the mobile phone may display a content summary of each notification message on the card 501. For example, the mobile phone may display content in the first line of each of the notification messages 801 to 805. That is, the notification content displayed in the notification message 801 to the notification message 805 may be incomplete. Certainly, the mobile phone may further display information such as a profile picture and a nickname of a contact corresponding to each notification message.

Figure 10A:
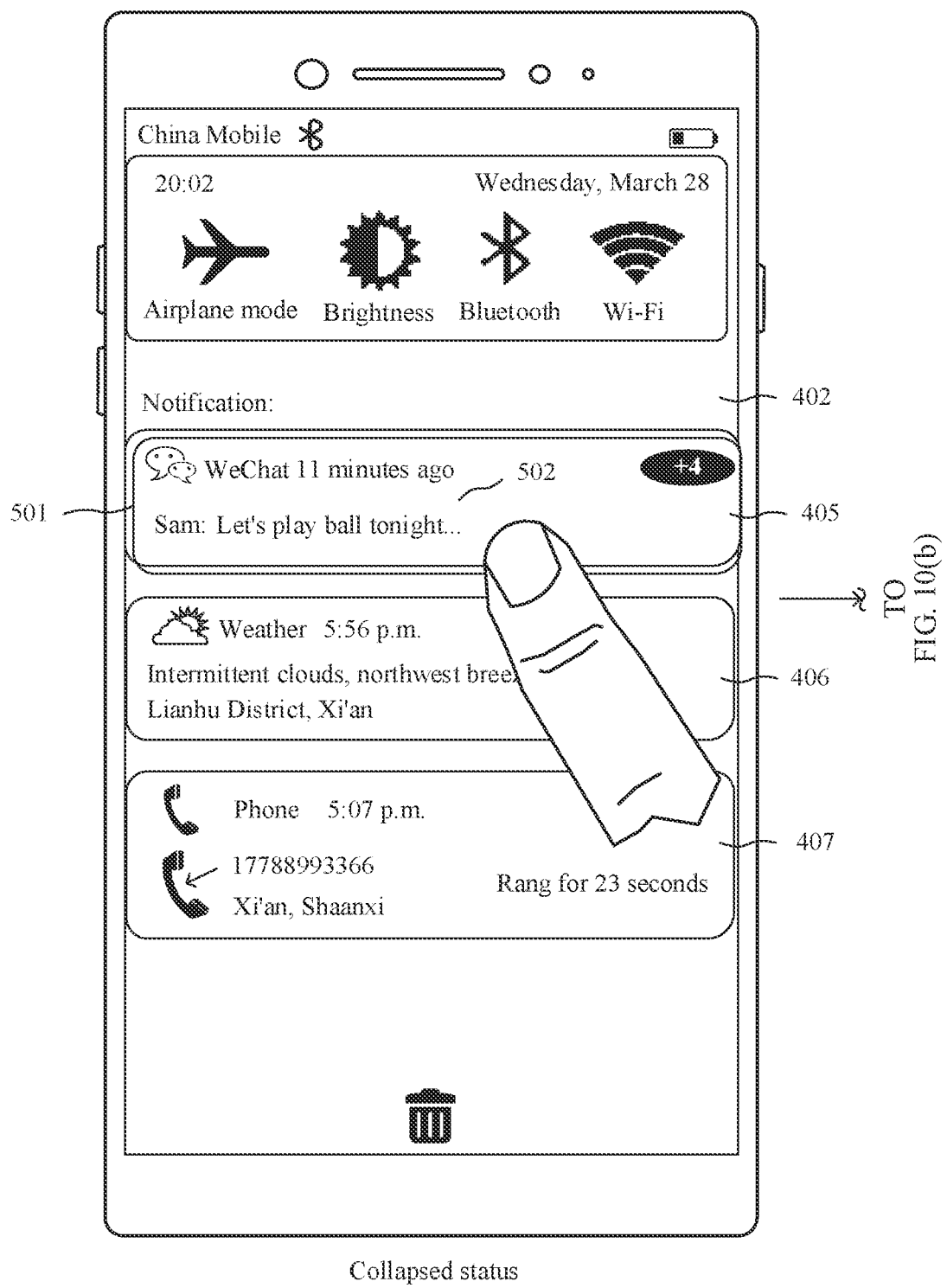
FIG. 10(a) and FIG. 10(b) are scenario diagrams 7 of a notification message preview method according to an embodiment of this application.
Figure 10B:
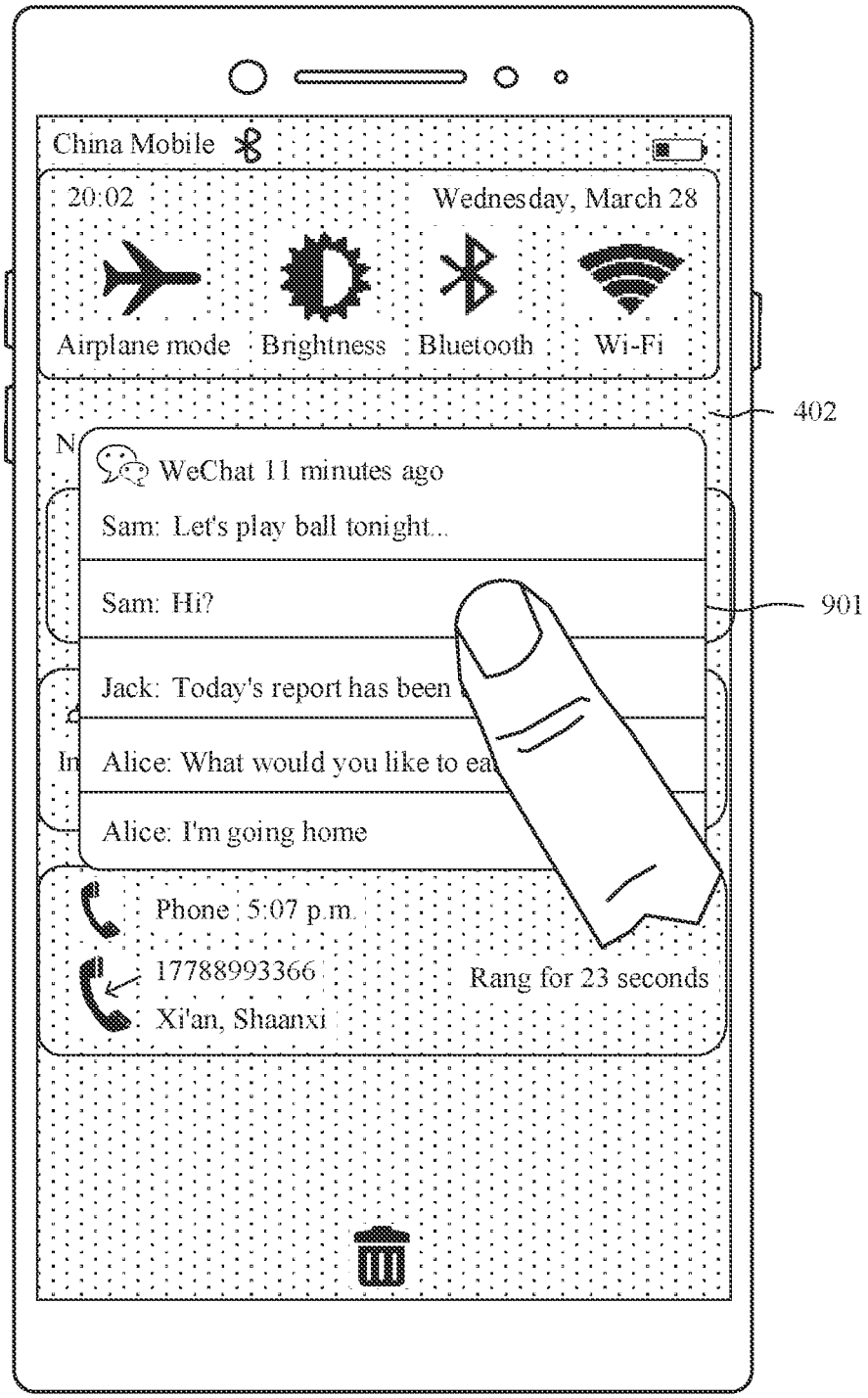

In some other embodiments, as shown in FIG. 10(*a*) and FIG. 10(*b*), after the mobile phone detects the touch and hold operation performed by the user on the card 501, the mobile phone may recreate a card 901 over the notification panel 402, and display, on the card 901, the five notification messages in the message group 405 from the WeChat app. In this case, the notification panel 402 is located in an interface under the card 901, and content and a position of each card in the notification panel 402 do not change. The card 901 is similar to the card 501 shown in FIG. 9(*b*). In this case, the message group 405 is also in the preview state.

For example, when the message group 405 is in the preview state shown by the card 901, the mobile phone may dim, blur, or hide the display interface (namely, the drop-down menu in which the notification panel 402 is located) under the card 901. This prompts the user to focus on reading each notification message on the card 901.

In other words, the embodiments of this application provide two display modes of the message group 405 in the preview state. Certainly, a person skilled in the art may set the display modes of the message group in the preview state based on actual experience or an actual application scenario. This is not limited in the embodiments of this application.

It can be learned that, when the message group is in the collapsed state, by using one touch and hold operation, the user may switch the message group from the collapsed state to the preview state. In the preview state, the mobile phone can display the content of the plurality of notification messages in the message group to the user. This facilitates the user to quickly preview the notification messages in the message group and simplifies an operation process of viewing related notification messages in the message group by the user.

Figure 11A:
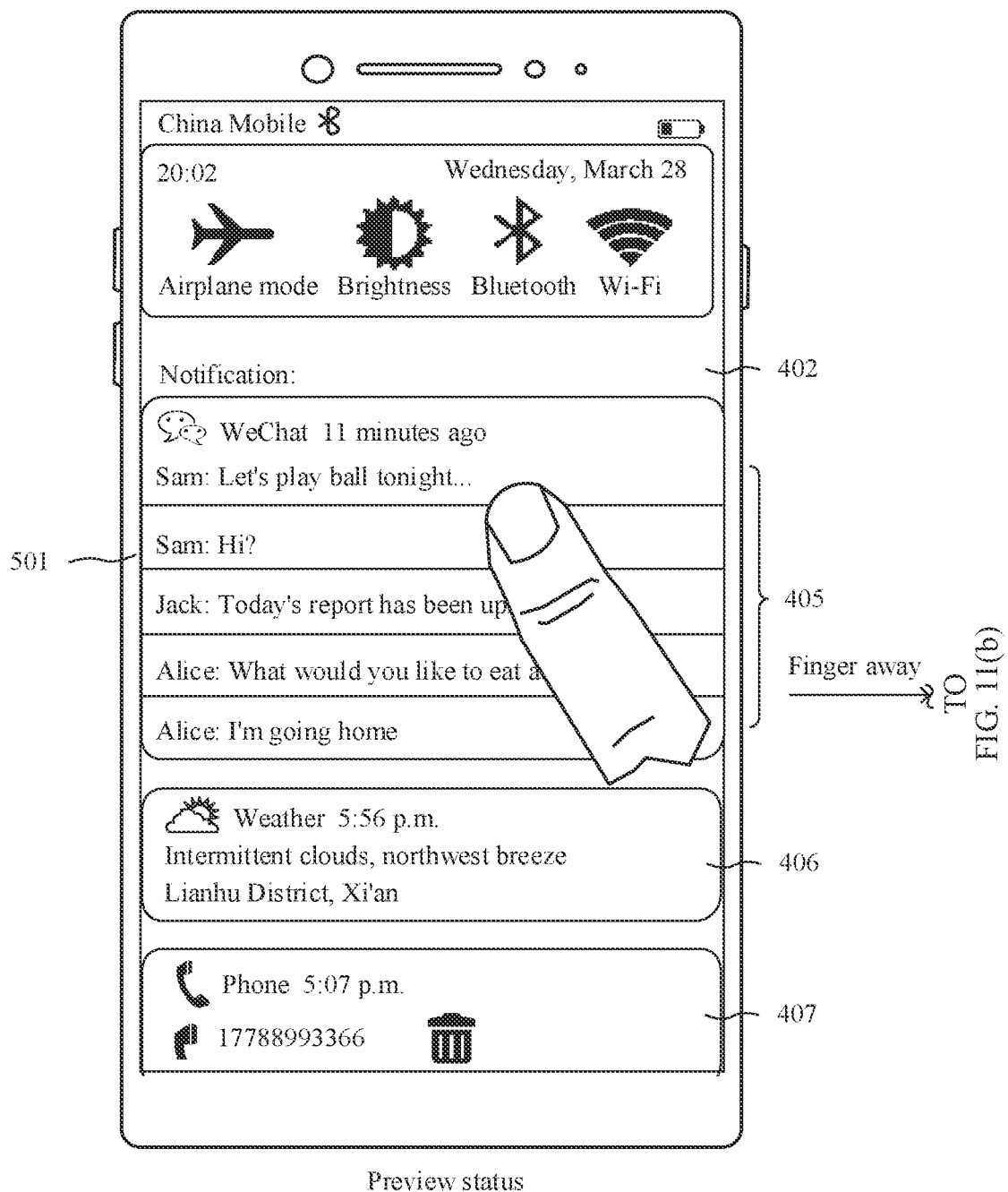
FIG. 11(a) and FIG. 11(b) are scenario diagrams 8 of a notification message preview method according to an embodiment of this application.
Figure 11B:
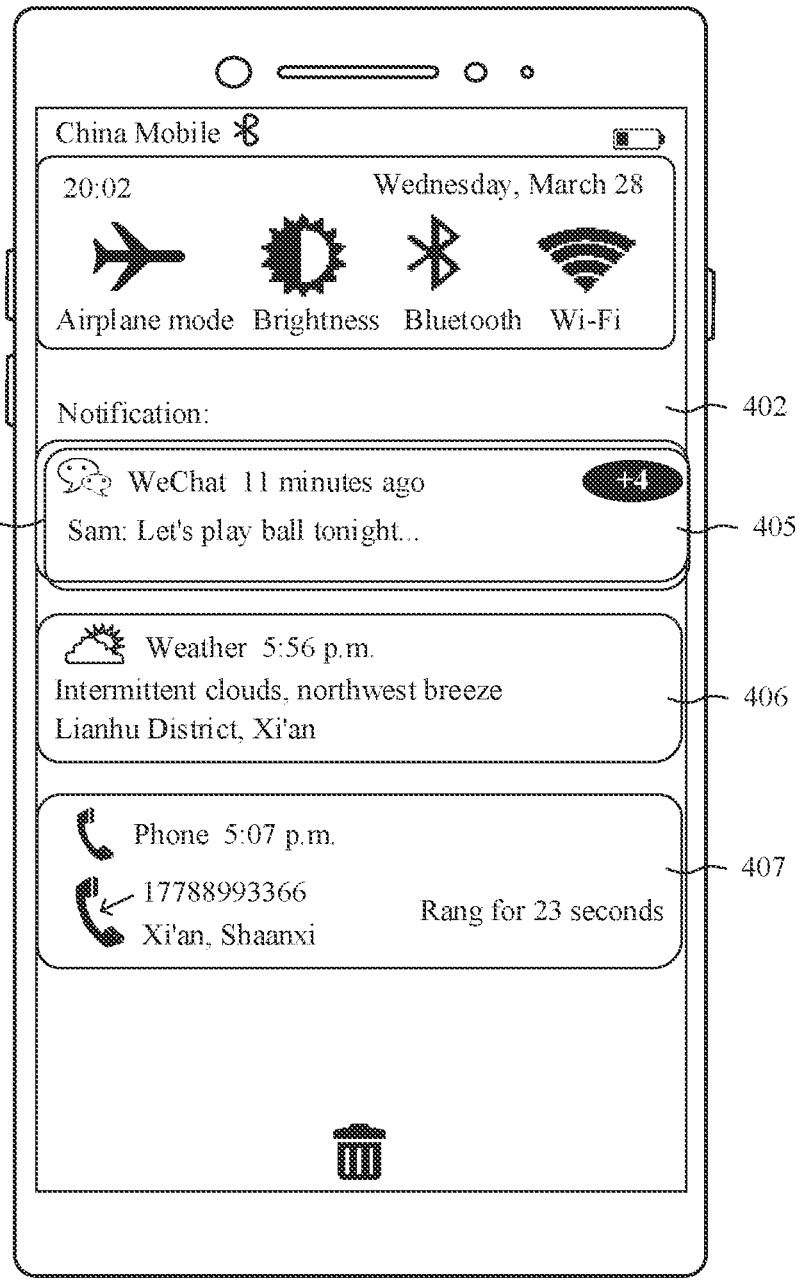

The expanded card 501 is still used as an example. After the plurality of notification messages in the message group 405 are displayed on the card 501 by using the touch and hold operation that is performed by the user, the user may continue to perform the touch and hold operation. As shown in FIG. 11(*a*), before detecting that the finger of the user leaves the screen of the mobile phone (that is, the touch and hold operation ends), the mobile phone may continuously display the message group 405 in the preview state. After detecting that the finger of the user leaves the screen of the mobile phone (that is, the touch and hold operation ends), as shown in FIG. 11(*b*), the mobile phone may switch the message group 405 back to the collapsed state. In this way, by using only one touch and hold operation, the user may trigger the mobile phone to switch the message group 405 from the collapsed state to the preview state, and switch the message group 405 from the preview state back to the collapsed state. This simplifies an operation process of switching the message group between the plurality of display states by the user.

Figure 12A:
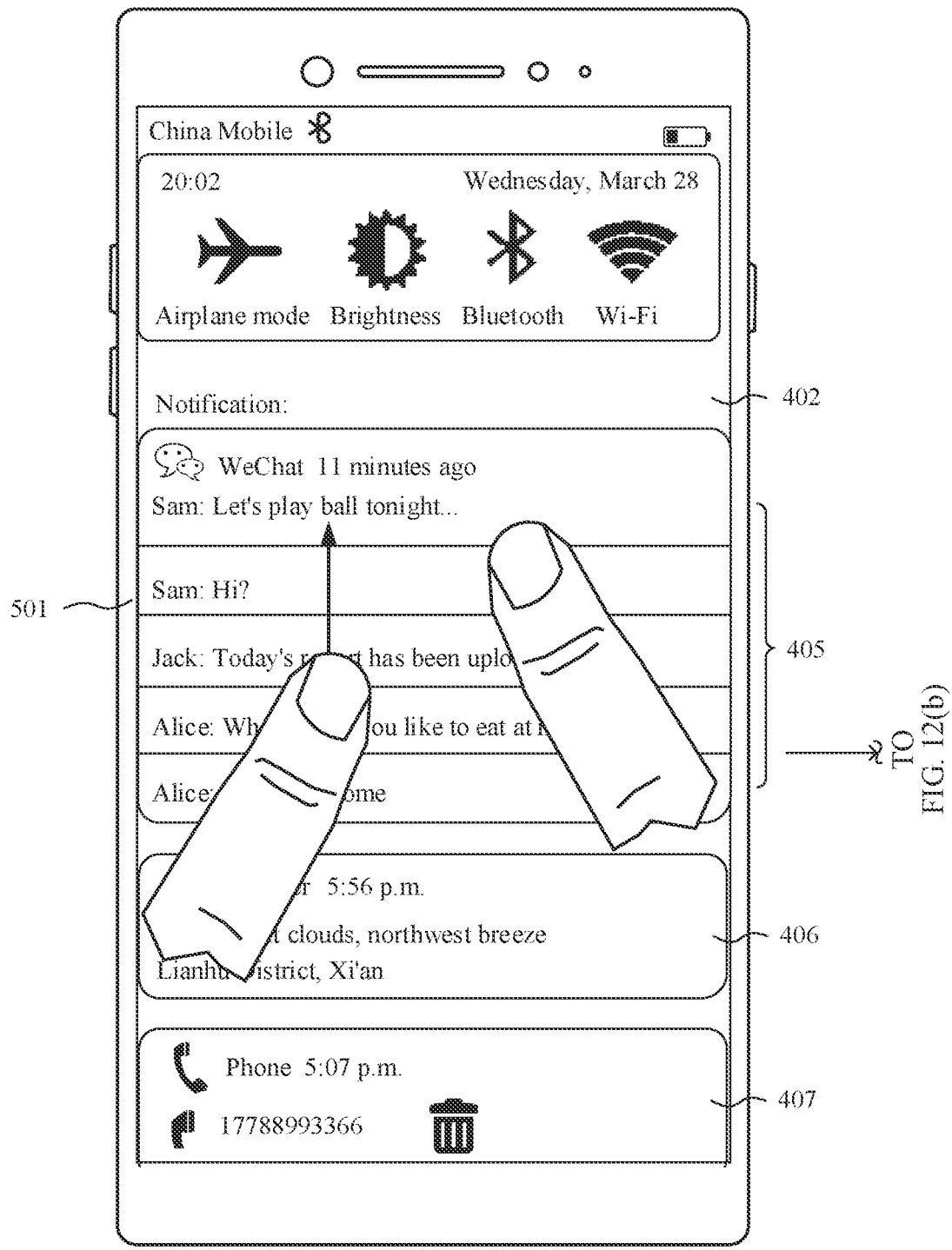
FIG. 12(a) and FIG. 12(b) are scenario diagrams 9 of a notification message preview method according to an embodiment of this application.
Figure 12B:
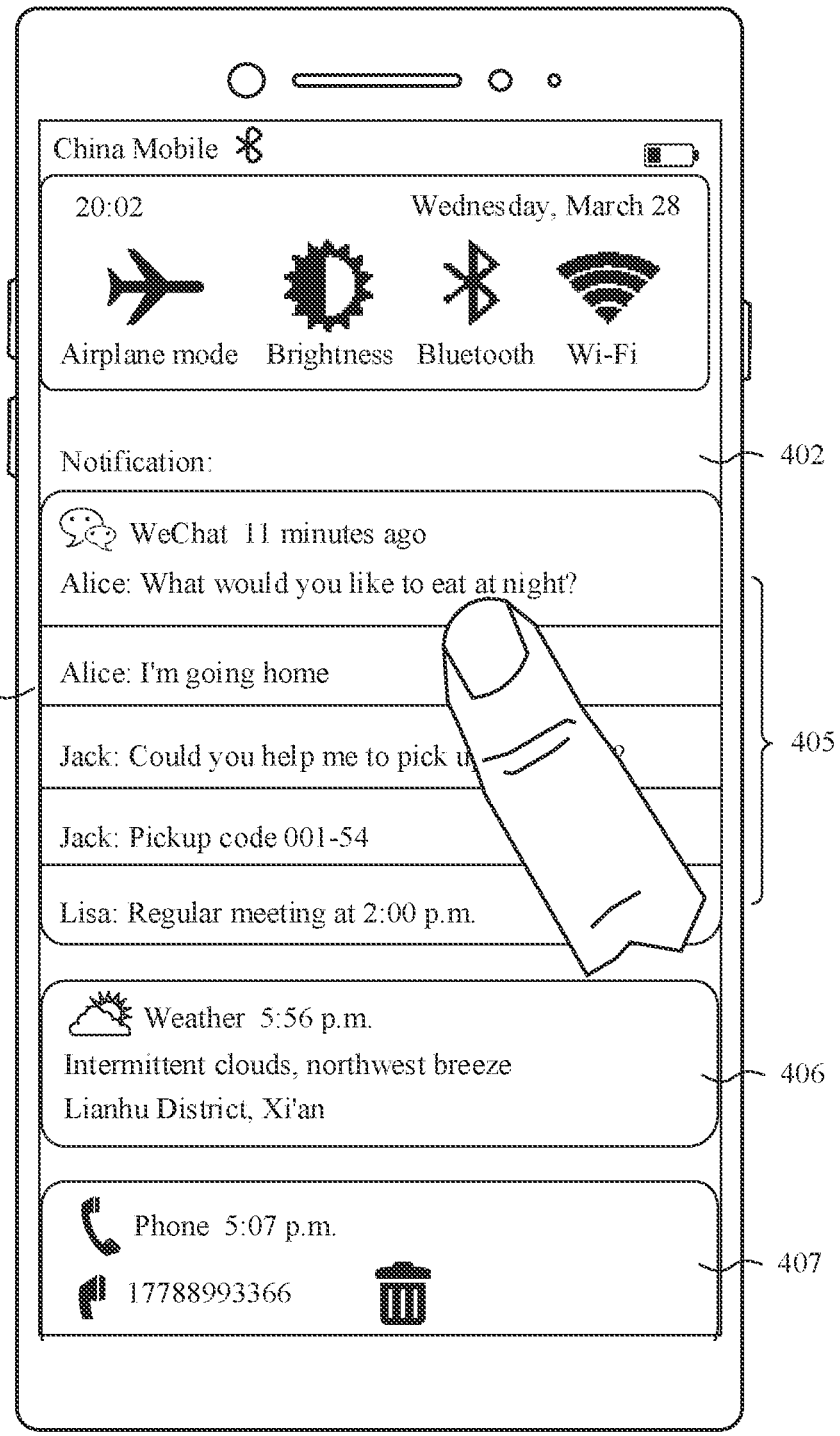

In addition, the expanded card 501 is still used as an example. A size of the expanded card 501 may be dynamically set according to a quantity of notification messages in the message group 405. Alternatively, the mobile phone may set the expanded card 501 to a fixed size. When the size of the expanded card 501 is fixed, as shown in FIG. 12(*a*) and FIG. 12(*b*), if the quantity of notification messages in the message group 405 is relatively large, all notification messages cannot be completely displayed on the card 501. In this case, while performing the touch and hold operation, the user may further enter a swipe operation by using another finger or a stylus. In this case, in response to the swipe operation, the mobile phone may display, on the card 501 in scrolling mode, other notification messages in the message group 405 that are not displayed.

Alternatively, when the notification messages in the message group 405 cannot be completely displayed on the expanded card 501, the mobile phone may automatically display the notification messages in the message group 405 in scrolling mode on the card 501. This is not limited in the embodiments of this application. Alternatively, the mobile phone may set a specific policy to use a plurality of notification messages in the message group 405 as notification messages that need to be displayed in the preview state. For example, the mobile phone may set to use a plurality of notification messages that are received within the last hour as notification messages that need to be displayed in the preview state. In this case, after detecting that the user enters the touch and hold operation to the message group 405 that is in the collapsed state, the mobile phone may expand the card 501, and display, on the card 501, the plurality of notification messages that are received within the latest hour.

In some embodiments, when the message group 405 is in the preview state, the user may still manage the notification messages in the message group 405 by using the message group 405 as a unit.

Figure 13A:
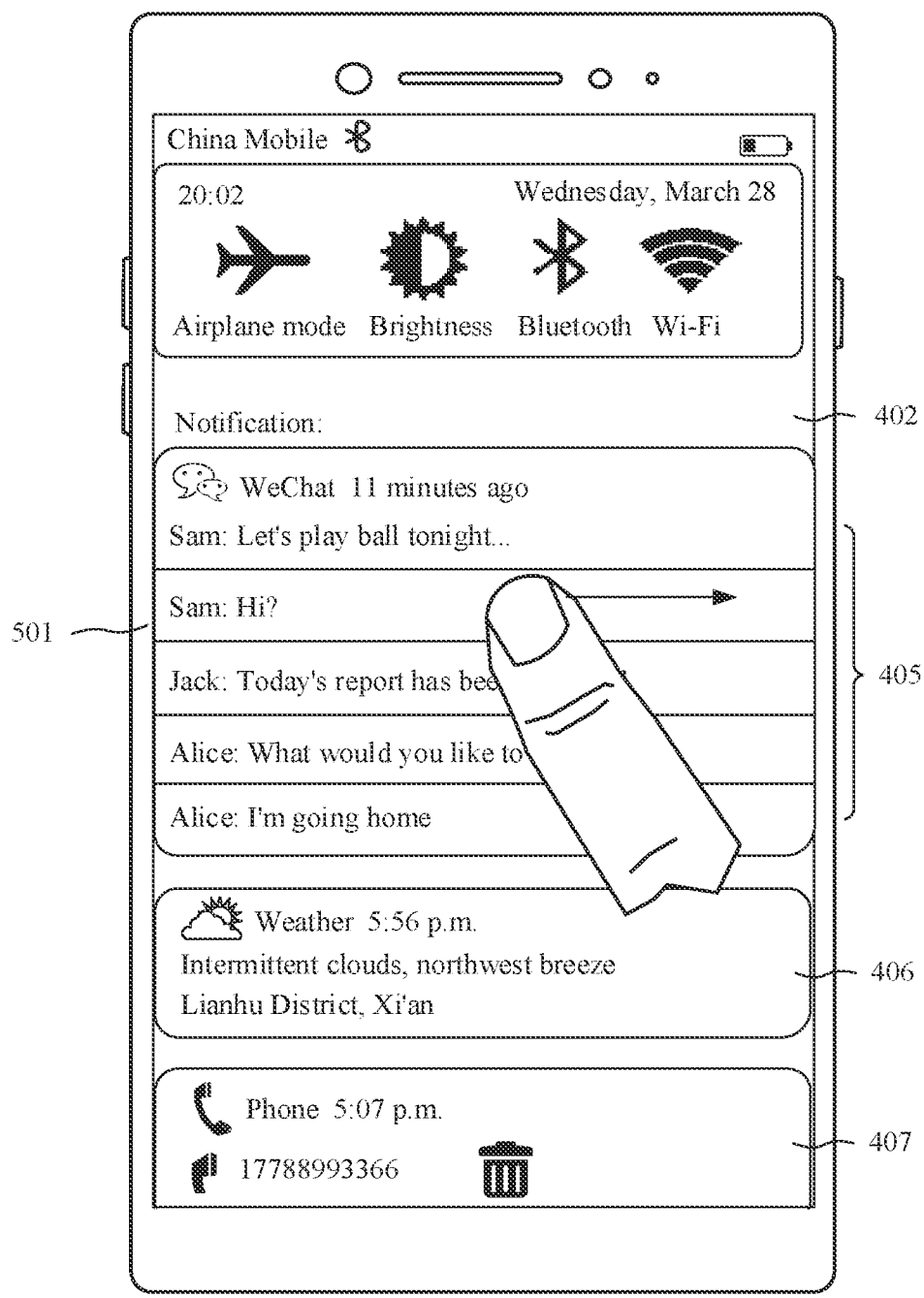
FIG. 13(a) and FIG. 13(b) are scenario diagrams 10 of a notification message preview method according to an embodiment of this application.
Figure 13B:
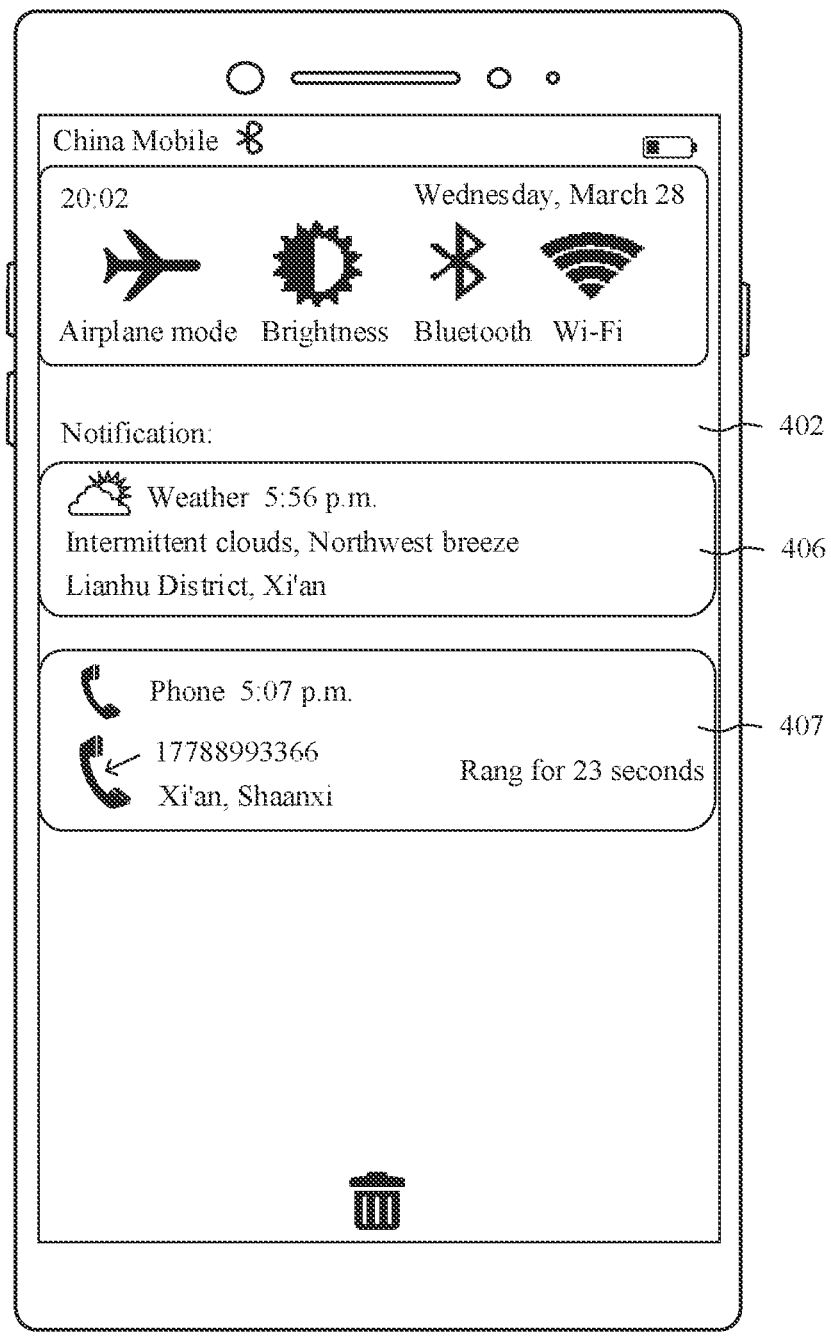

For example, as shown in FIG. 13(*a*), after the plurality of notification messages in the message group 405 are displayed on the card 501 by using the touch and hold operation that is performed by the user, the finger of the user does not need to leave the screen, and may continue to enter a swipe right operation to the expanded card 501. As shown in FIG. 13(*b*), after detecting that the user swipes the expanded card 501 rightwards, the mobile phone may delete the card 501 in the notification panel 402. In this case, all the notification messages on the card 501 are deleted.

Figure 14A:
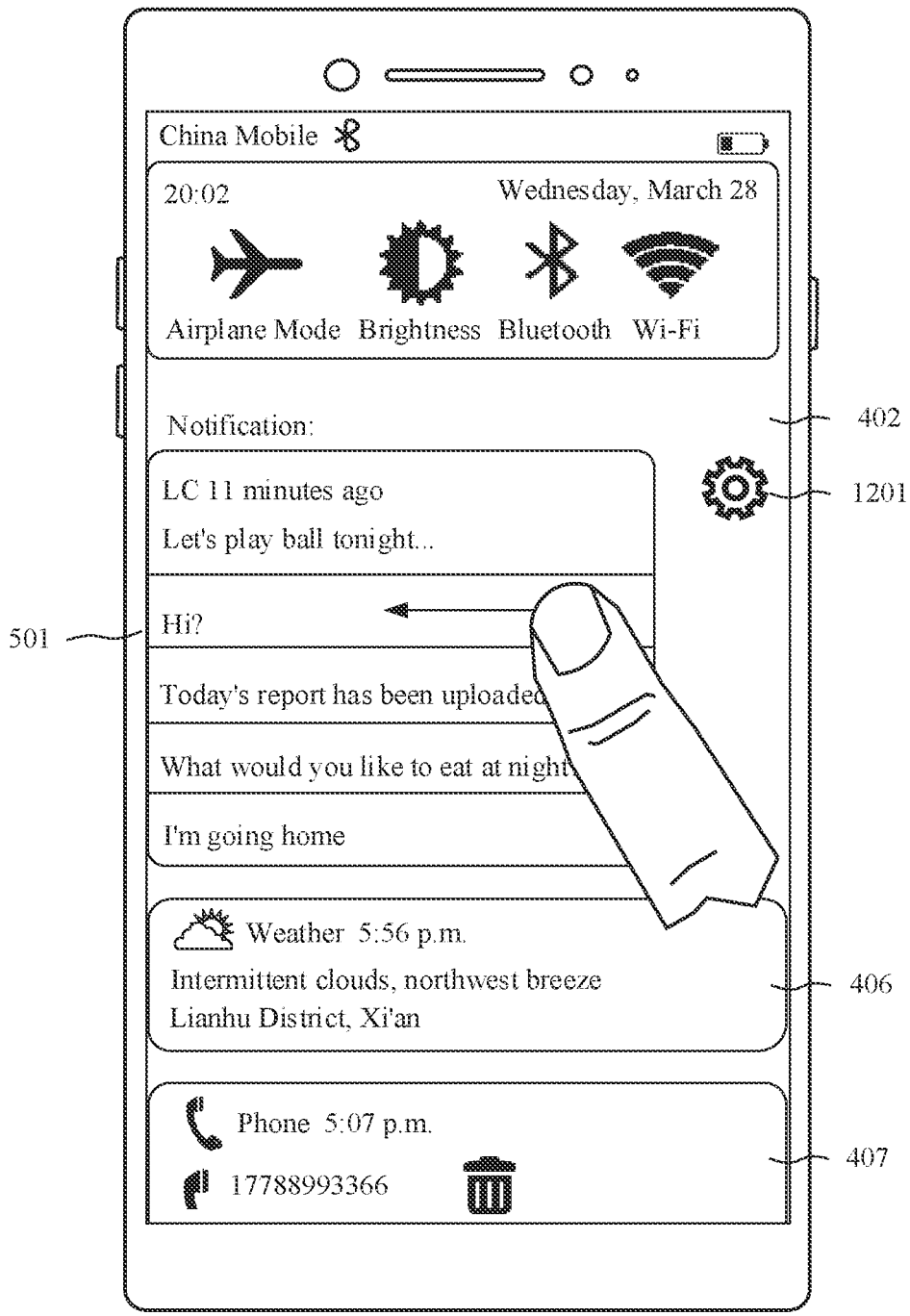
FIG. 14(a) and FIG. 14(b) are scenario diagrams 11 of a notification message preview method according to an embodiment of this application.
Figure 14B:
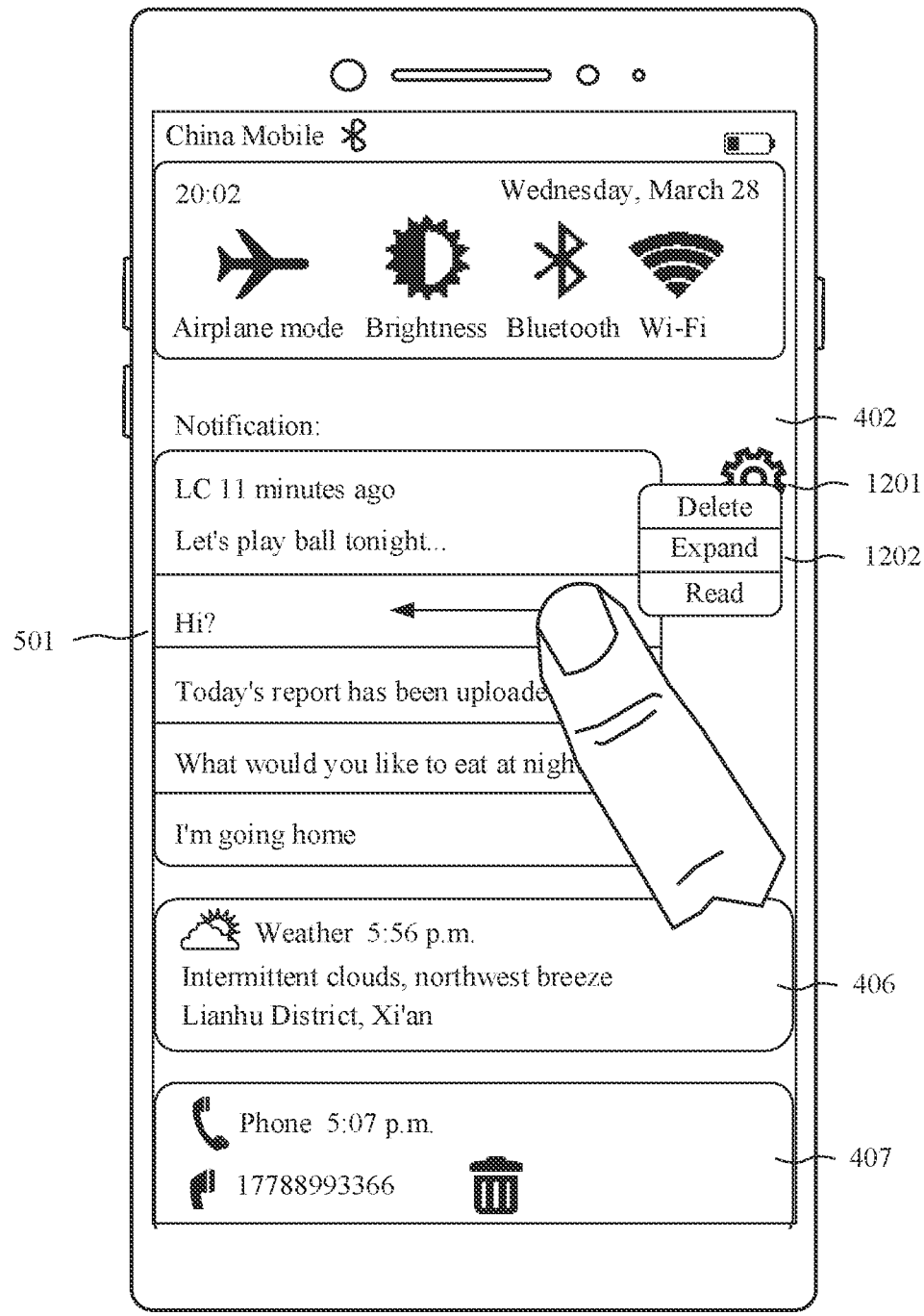

For another example, as shown in FIG. 14(*a*), after the plurality of notification messages in the message group 405 are displayed on the card 501 by using the touch and hold operation that is performed by the user, the finger of the user does not need to leave the screen, and may continue to enter a swipe left operation to the expanded card 501. After detecting that the user swipes the expanded card 501 leftwards, the mobile phone may display a management button 1201. If the mobile phone detects that the user selects the management button 1201, as shown in FIG. 14(*b*), the mobile phone may display a management menu 1202 of the message group 405. The management menu 1202 may include an option of deleting the message group 405, an option of marking the message group 405 as read, an option of expanding the message group 405, and the like. That is, in the preview state, the user may manage, by using the management menu 1202, the plurality of notification messages in the message group 405 by using the message group 405 as a unit.

In some other embodiments, when the message group 405 is in the preview state, the user may further perform an operation on one notification message in the message group 405.

Figure 15A:
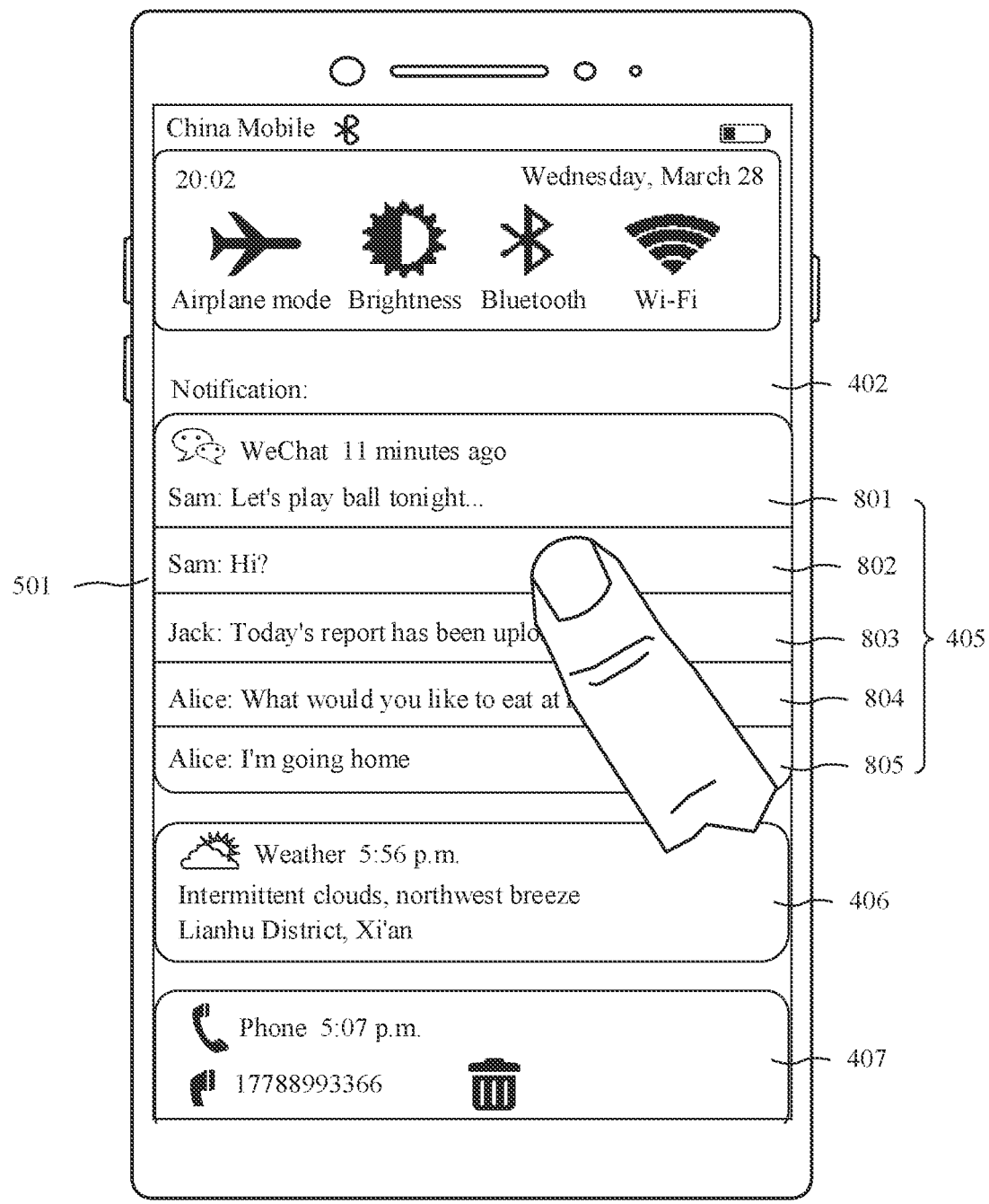
FIG. 15(a) and FIG. 15(b) are scenario diagrams 12 of a notification message preview method according to an embodiment of this application.
Figure 15B:
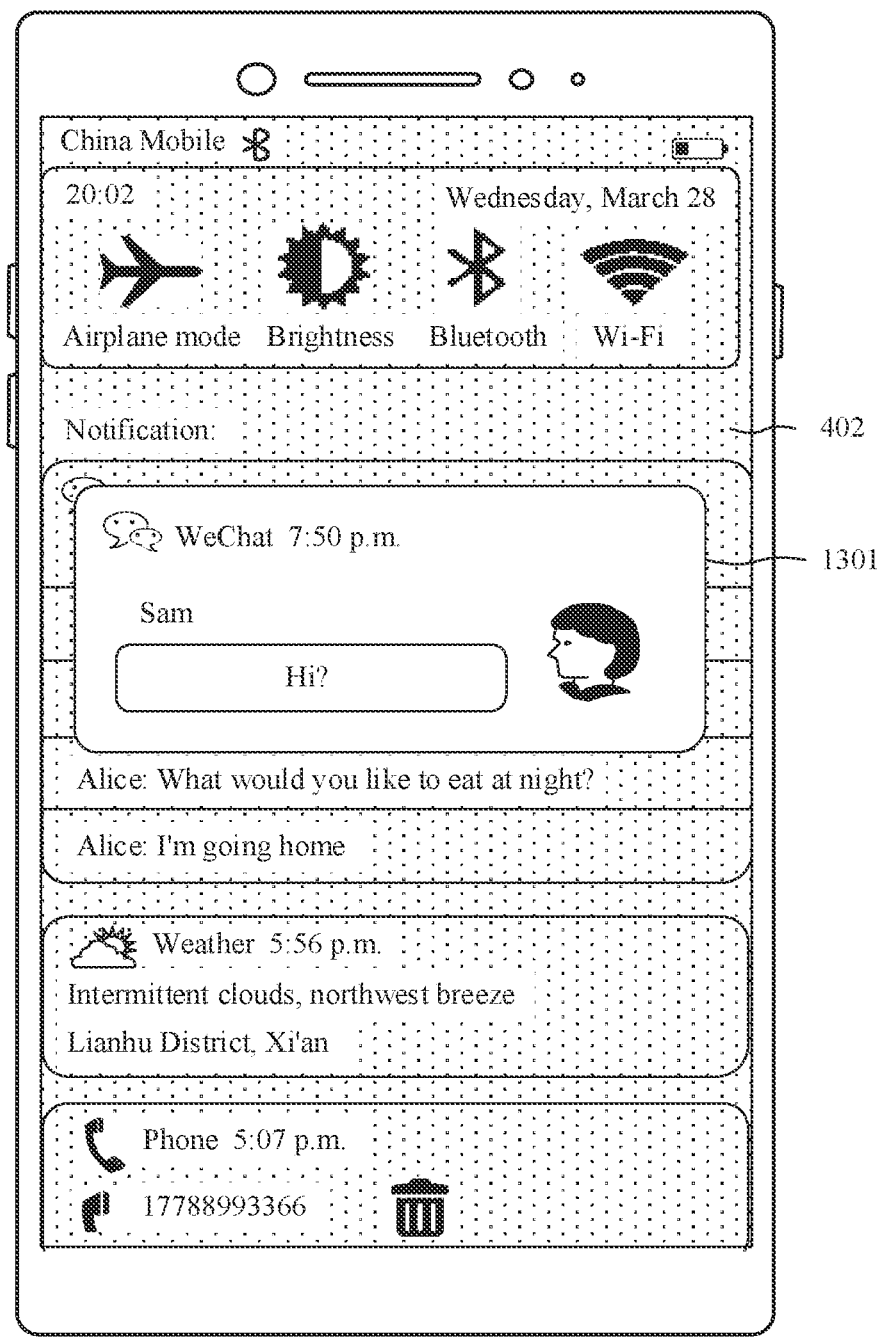

For example, as shown in FIG. 15(*a*), after the plurality of notification messages in the message group 405 are displayed on the card 501 by using the touch and hold operation that is performed by the user, the finger of the user does not need to leave the screen. If the mobile phone detects that time spent by the finger of the user on one notification message on the card 501 exceeds preset time. For example, after the mobile phone detects that the finger of the user stays on the notification message 802 for more than 2 seconds, as shown in FIG. 15(*b*), the mobile phone may display detailed content 1301 of the notification message 802. For example, the mobile phone may expand the notification message 802 on the card 501, to display the detailed content 1301 of the notification message 802. For another example, the mobile phone may also create a card on the card 501 to display the detailed content 1301 of the notification message 802. This is not limited in the embodiments of this application.

Alternatively, after the mobile phone displays the plurality of notification messages in the message group 405 on the card 501, if the mobile phone detects that the finger of the user performs a press operation on one notification message on the card 501, as shown in FIG. 15(*b*), the mobile phone may also display the detailed content 1301 of the notification message 802. That is, after switching the message group to the preview state for previewing, the user may further select one notification message in the message group to view detailed content of this notification message. In this way, the user may quickly view detailed content of one notification message in the message group without expanding the entire message group.

In some embodiments, when the message group 405 is in the preview state, in response to a second operation performed by the user on the message group 405, the mobile phone may switch the message group 405 from the preview state to the expanded state. The second operation may be any operation different from the first operation.

For example, the second operation may be a swipe up operation or a swipe down operation. The expanded card 501 is still used as an example. After the plurality of notification messages in the message group 405 are displayed on the card 501 by using the touch and hold operation that is performed by the user, if the mobile phone detects that the finger of the user continues to touch and hold the screen of the mobile phone, the mobile phone may continue to display the expanded card 501. After the card 501 is expanded, as shown in FIG. 16(*a*), if the mobile phone detects that the finger of the user enters the swipe down operation on the screen of the mobile phone, the mobile phone may switch the message group 405 from the preview state to the expanded state.

Figure 16A:
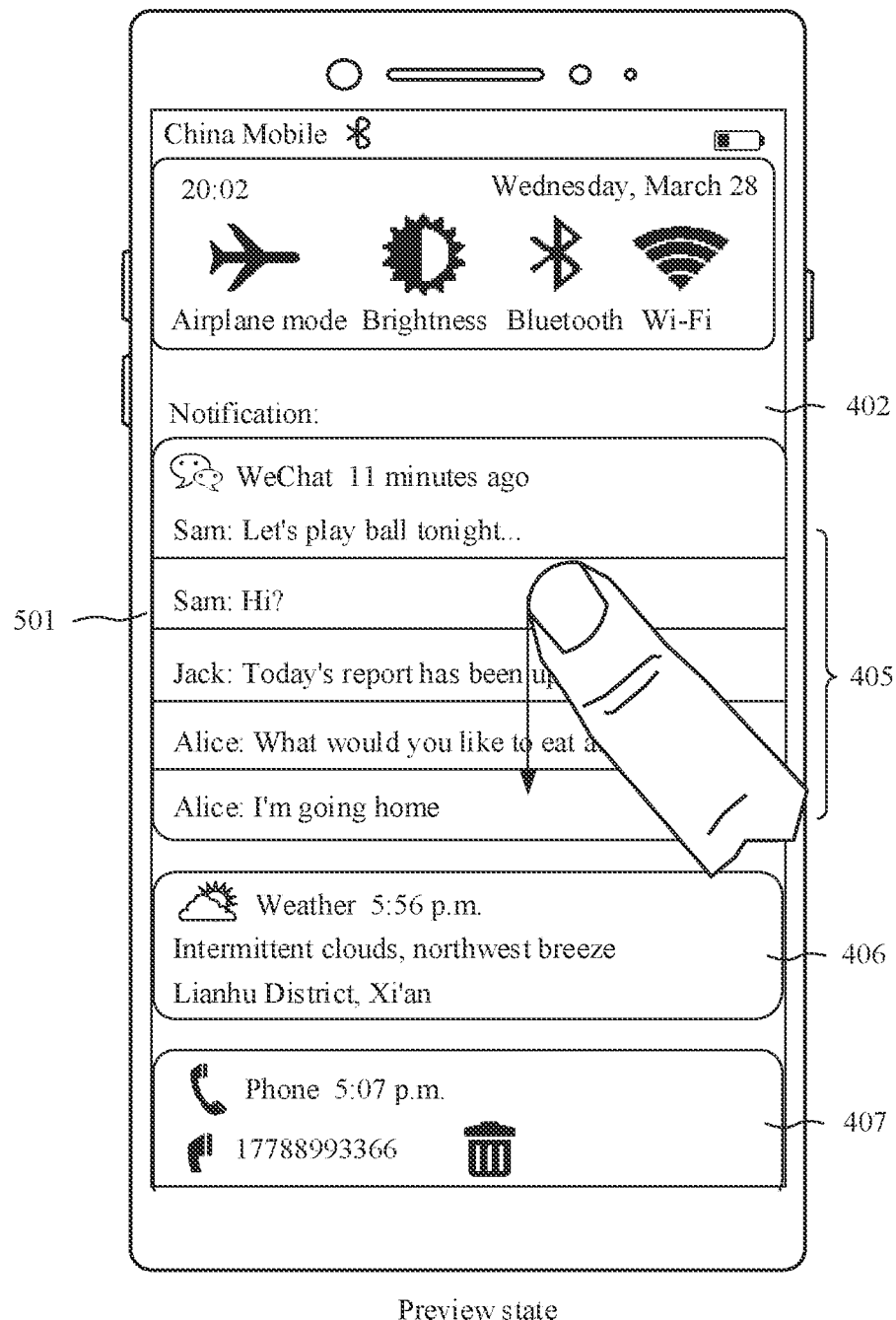
FIG. 16(a) and FIG. 16(b) are scenario diagrams 13 of a notification message preview method according to an embodiment of this application.
Figure 16B:
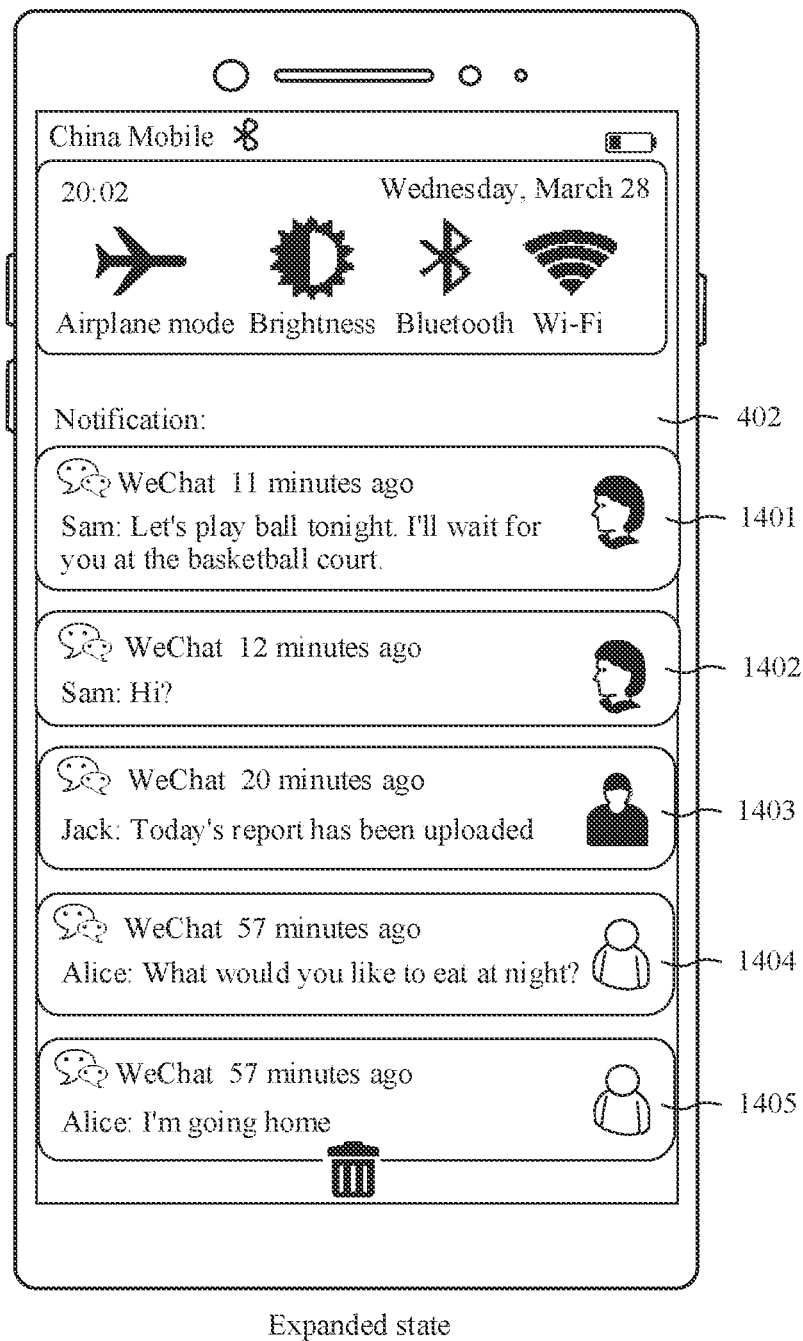

For example, as shown in FIG. 16(*b*), when the message group 405 is in the expanded state, the mobile phone may display, in the notification panel 402, each notification message in the message group 405 in a form of a card. That the message group 405 includes five notification messages from the WeChat app is still used as an example. After expanding the message group 405, the mobile phone may delete the card 501 that is displayed when the message group 405 is in the expanded state, and generate a card 1401 to a card 1405. The mobile phone may display each notification message in the message group 405 on each of the card 1401 to the card 1405. In addition, the mobile phone may display detailed content of each notification message on a corresponding card. For example, the detailed content on each card may include specific time at which a contact sends a chat message, specific content of a chat message, a name and a profile picture of a contact, and the like.

It can be learned that, when the message group 405 is in the collapsed state, by using the touch and hold operation, the user may trigger the mobile phone to switch the message group 405 from the collapsed state to the preview state. Further, the finger of the user does not need to leave the screen of the mobile phone, and may continue to enter a swipe down operation to trigger the mobile phone to switch the message group 405 from the preview state to the expanded state. In this case, for the user, in an operation process from touching the screen of the mobile phone to leaving the screen of the mobile phone by the finger, the user may control the mobile phone to switch the message group 405 in the three display states: the collapsed state, the preview state, and the expanded state. This simplifies an operation process of switching the message group between the plurality of display states by the user, and improves user experience.

When the message group 405 is in the expanded state, the mobile phone may manage the plurality of notification messages in the message group 405 by using each notification message as a unit.

Figure 17A:
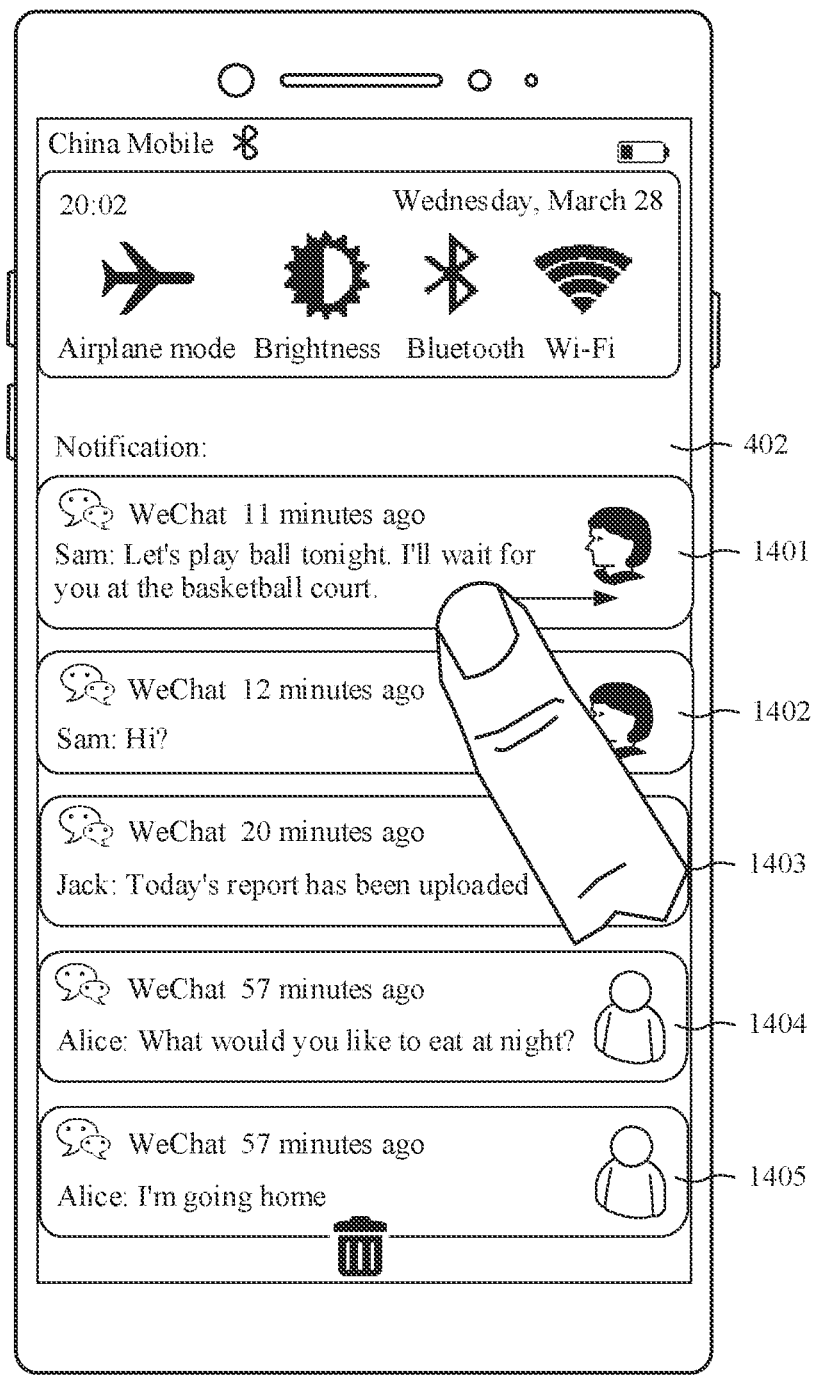
FIG. 17(a) and FIG. 17(b) are scenario diagrams 14 of a notification message preview method according to an embodiment of this application.

For example, as shown in FIG. 17(a), after the message group 405 is expanded, each notification message in the message group may be displayed on each of the card 1401 to the card 1405. If the mobile phone detects that the user swipes the card 1401 rightwards, the mobile phone may delete the card 1401 and the notification message on the card 1401. In this case, the remaining four notification messages in the message group 405 are still displayed on the card 1402 to the card 1405.

Figure 17B:
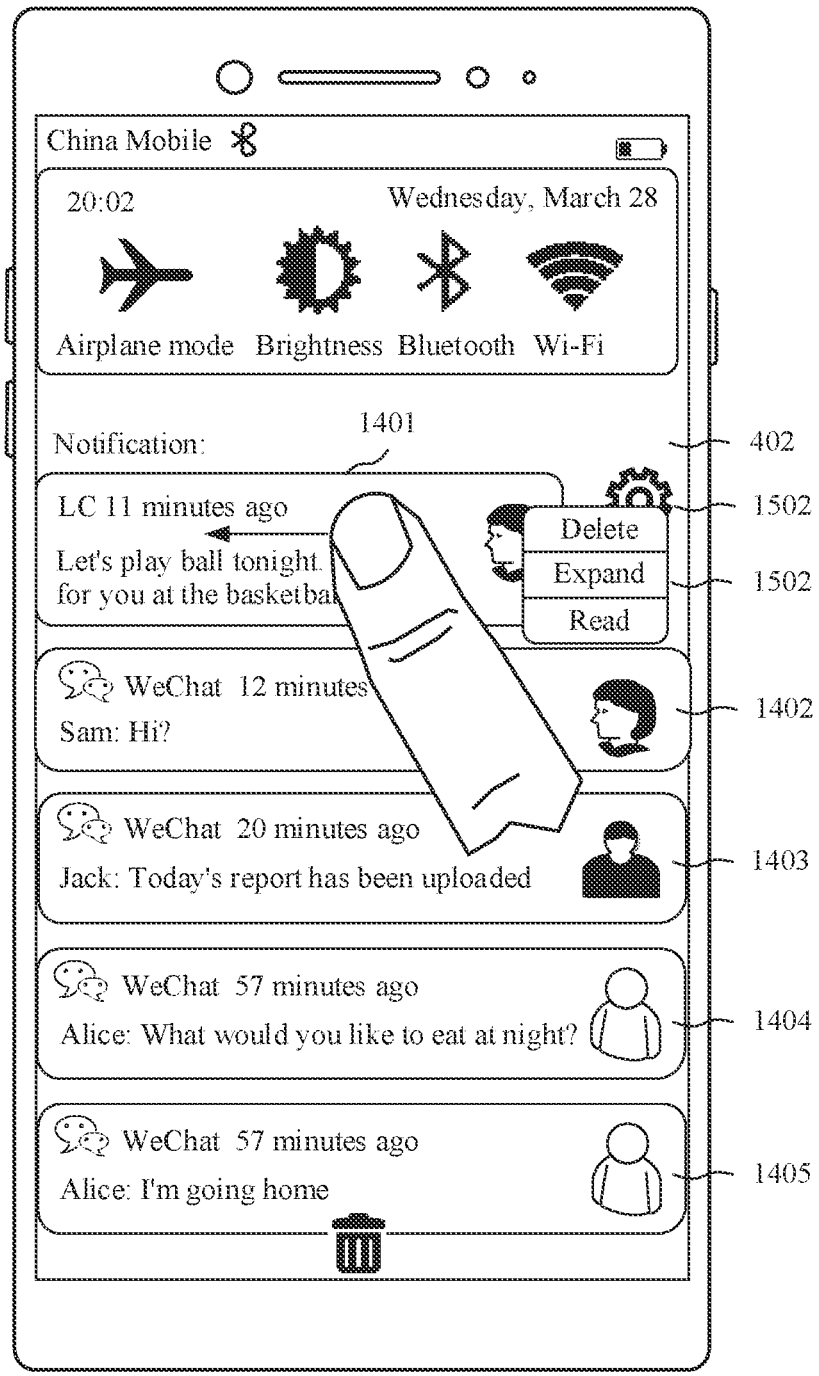

For another example, as shown in FIG. 17(b), if the mobile phone detects that the user swipes the card 1401 leftwards, the mobile phone may display a management button 1501 of the card 1401. If the mobile phone detects that the user selects the management button 1501, the mobile phone may display a management menu 1502 corresponding to the card 1401. The management menu 1502 may include an option of deleting the card 1401, an option of marking the notification message on the card 1401 as read, and the like. That is, in the expanded state, the user may manage each notification message in the message group 405 by using the management menu 1502 of each notification message.

Figure 18A:
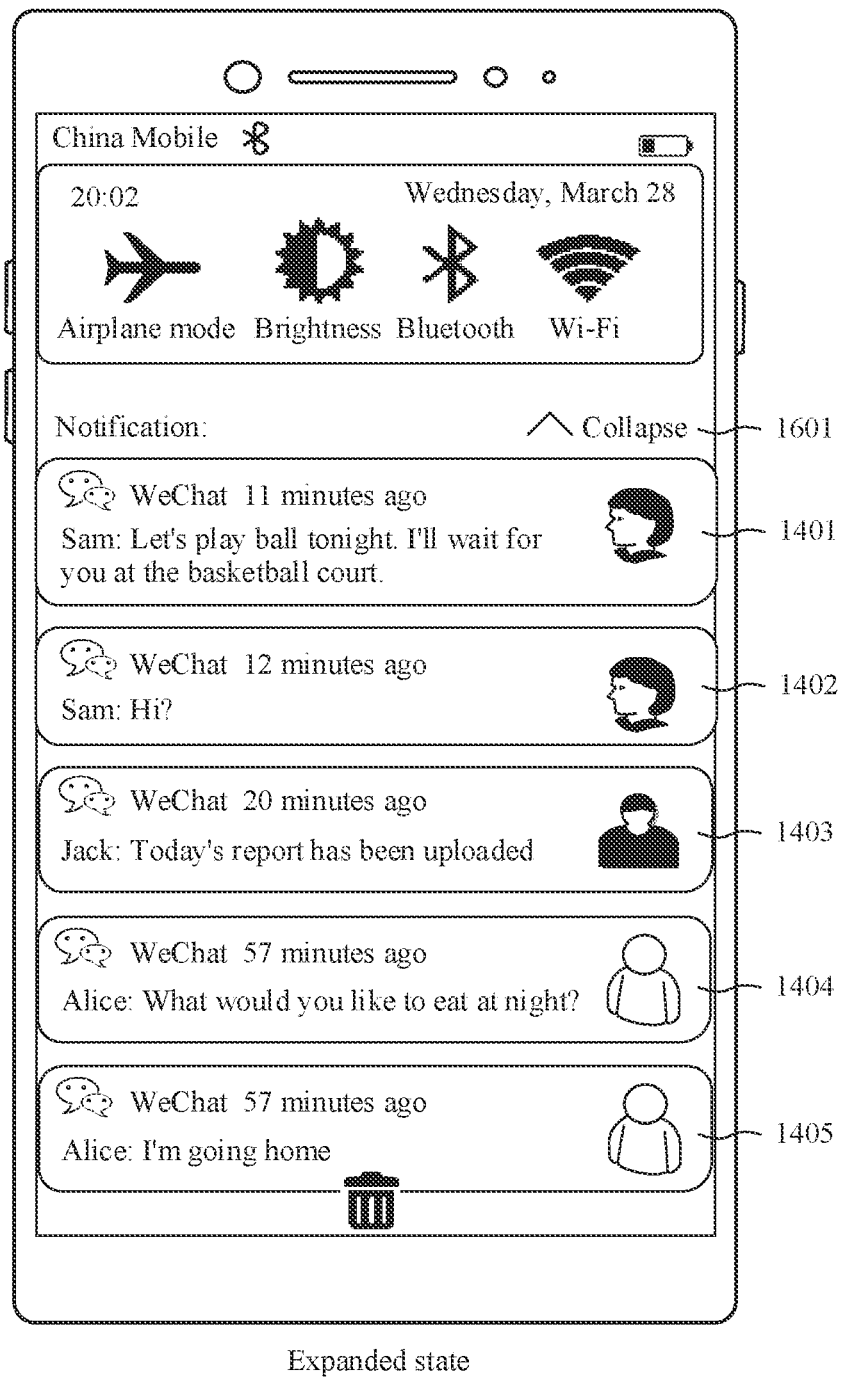
FIG. 18(a) and FIG. 18(b) are scenario diagrams 15 of a notification message preview method according to an embodiment of this application.

In addition, the user may switch the message group 405 from the expanded state to the collapsed state or the preview state. For example, as shown in FIG. 18(a), after the mobile phone expands the message group 405, each notification message in the group is displayed on each of the card 1401 to the card 1405. The mobile phone may display a collapse button 1601 near the card 1401 that is located at the top (or the card 1405 that is located at the bottom). If the mobile phone detects that the user touches and holds the collapse button 1601, the mobile phone may switch the message group 405 to the preview state. In this case, the mobile phone may display the message group 405 as the card 901 shown in FIG. 10(b) or the card 501 shown in FIG. 9(b).

Figure 18B:
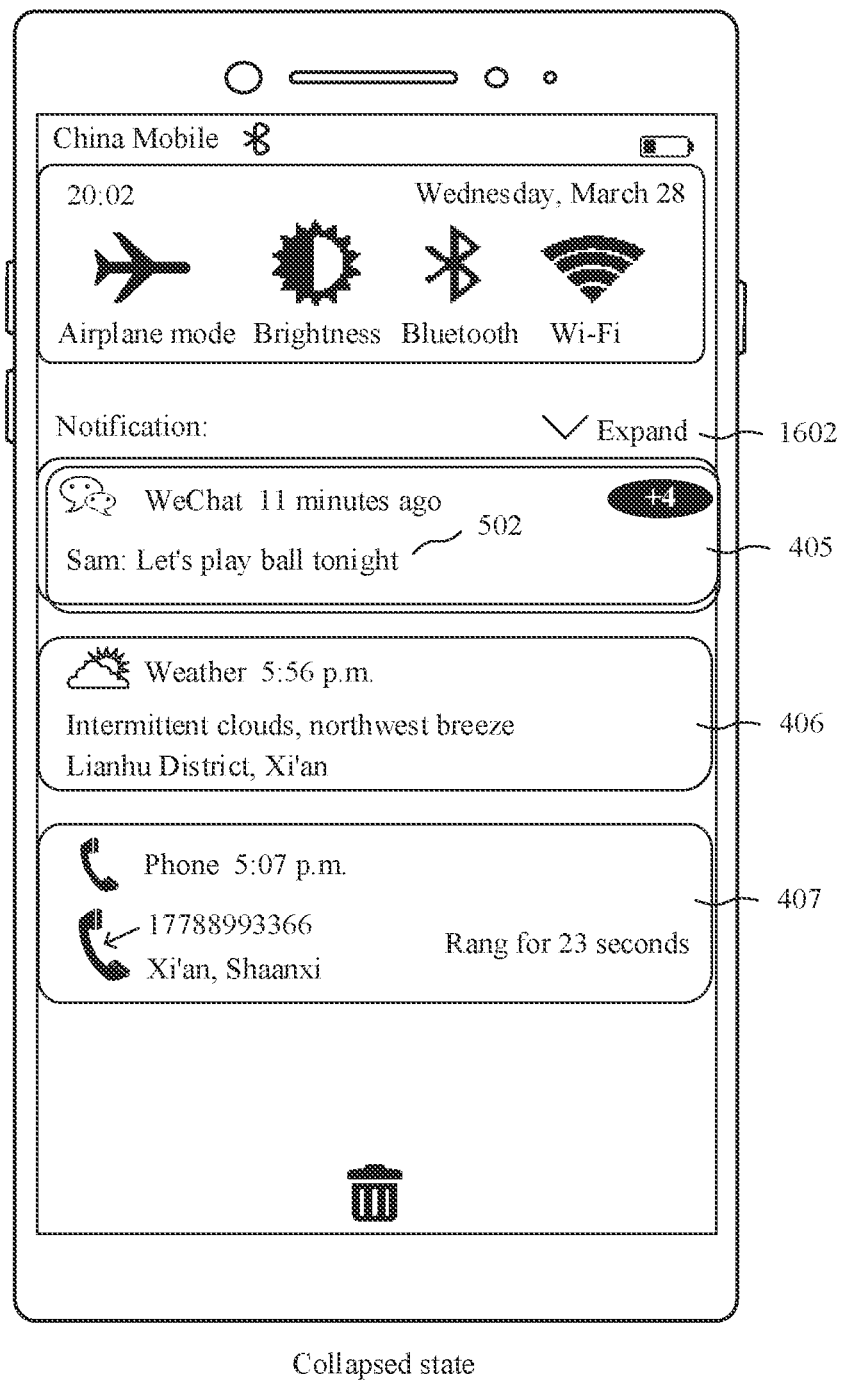

Correspondingly, if the mobile phone detects that the user taps the collapse button 1601, as shown in FIG. 18(b), the mobile phone may switch the message group 405 to the collapsed state. In this case, the mobile phone displays only one notification message in the message group 405. Similarly, as shown in FIG. 17(b), when the message group 405 is in the collapsed state, the mobile phone may set an expand button 1602 corresponding to the message group 405. If the mobile phone detects that the user taps the expand button 1602, the mobile phone may switch the message group 405 to the expanded state. In this case, the mobile phone may display the message group 405 as the interface shown in FIG. 17(a).

It can be learned that, when the mobile phone displays the notification messages of the message group type, a display mode, namely, the preview state, is added between the collapsed state and the expanded state. In the preview state, the mobile phone can display the plurality of notification messages in the message group to the user, so that the user can quickly preview the notification messages in the message group. In addition, in the preview state, the user may further manage all the notification messages in the entire message group at a granularity of a message group. This improves management efficiency and usage experience of the user on the message group.

Figure 19:
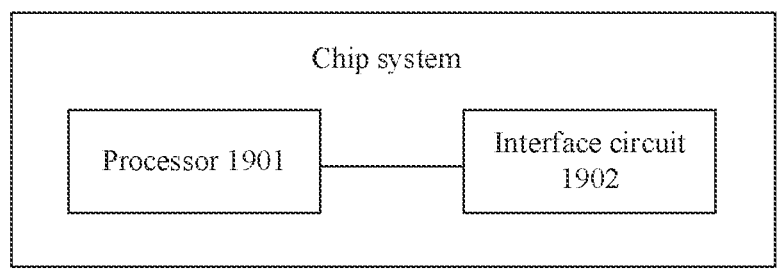
FIG. 19 is a schematic diagram of a structure of a chip system according to an embodiment of this application.

The embodiments of this application disclose a chip system. As shown in FIG. 19, the chip system includes at least one processor 1901 and at least one interface circuit 1902. The processor 1901 and the interface circuit 1902 may be interconnected through a line. For example, the interface circuit 1902 may be configured to receive a signal from another apparatus (for example, a memory). For another example, the interface circuit 1902 may be configured to send a signal to another apparatus (for example, the processor 1901). For example, the interface circuit 1902 may read instructions stored in the memory, and send the instructions to the processor 1901. When the instructions are executed by the processor 1901, the electronic device is enabled to perform the steps in the foregoing embodiments. Certainly, the chip system may further include another discrete device. This is not specifically limited in the embodiments of this application.

The embodiments of this application disclose an electronic device, including a processor, and a memory, an input device, and an output device that are connected to the processor. The input device and the output device may be integrated into one device. For example, a touch-sensitive surface may be used as the input device, a display may be used as the output device, and the touch-sensitive surface and the display may be integrated into a touchscreen.

Figure 20:
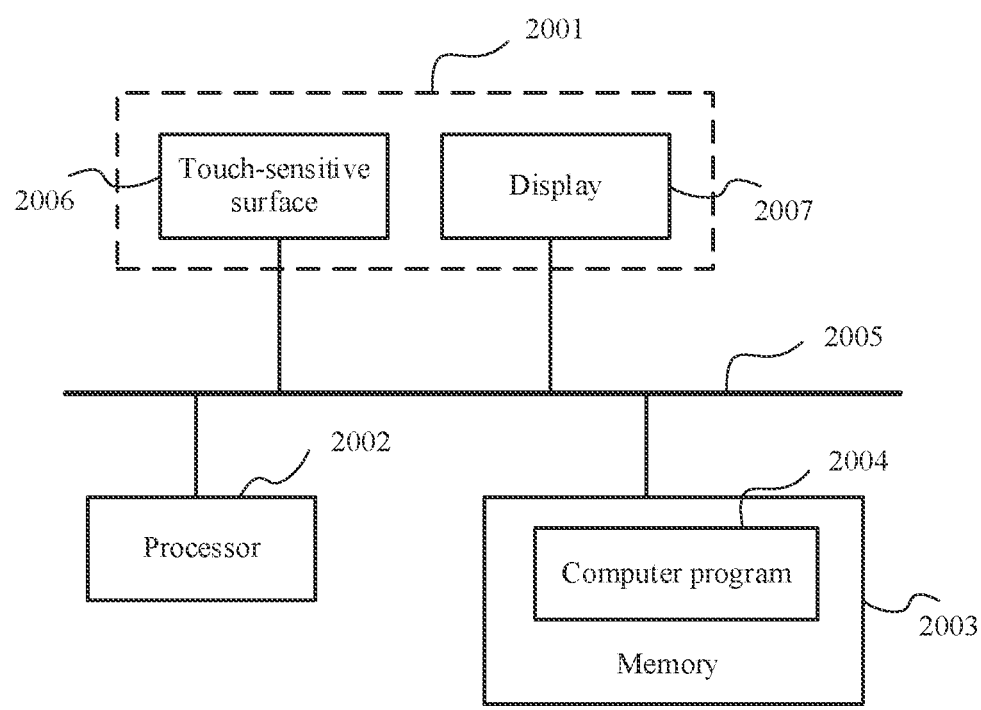
FIG. 20 is a schematic diagram 2 of a structure of an electronic device according to an embodiment of this application.

In this case, as shown in FIG. 20, the electronic device may include a touchscreen 2001. The touchscreen 2001 includes a touch-sensitive surface 2006, a display 2007, one or more processors 2002, a memory 2003, one or more application programs (not shown), and one or more computer programs 2004. The foregoing devices may be connected through one or more communications buses 2005. The one or more computer programs 2004 are stored in the memory 2003 and are configured to be executed by the one or more processors 2002. The one or more computer programs 2004 include instructions, and the instructions may be used to perform the steps in the foregoing embodiments. All related content of the steps in the foregoing method embodiments may be cited in function descriptions of corresponding physical devices. Details are not described herein again.

For example, the processor 2002 may be specifically the processor 110 shown in FIG. 2, the memory 2003 may be specifically the internal memory 121 and/or the external memory 120 shown in FIG. 2, and the display 2007 may be specifically the display 194 shown in FIG. 2, and the touch-sensitive surface 2006 may be specifically the touch sensor 180K in the sensor module 180 shown in FIG. 2. This is not limited in the embodiments of this application.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

Function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A method implemented by an electronic device, wherein the method comprises:
    displaying, on a first card, a first notification message in a message group, wherein the message group comprises N notification messages, and wherein other notification messages in the message group are hidden;
    receiving, from a user on the first card, a touch and hold operation;
    displaying, on a second card in response to the touch and hold operation, M notification messages from the N notification messages, wherein the M notification messages comprise the first notification message, wherein 1<M≤N, and wherein both M and N are integers; and
    making a first detection that a finger of the user does not leave a touchscreen after performing the touch and hold operation, making, in response to the first detection, a second detection that the user enters a first swipe operation to the second card, and displaying, in a scrolling mode and in response to the second detection, the N notification messages on the second card; or
    making a third detection that the finger leaves the touchscreen after performing the touch and hold operation and redisplaying, in response to the third detection, the first notification message on the first card.

2. The method of claim 1, further comprising expanding the first card to form the second card, wherein the first card and the second card are located in a same interface.

3. The method of claim 1, further comprising displaying the second card in a first interface in which the first card is located, wherein a second interface in which the second card is located covers the first interface.

4. The method of claim 3, further comprising performing blurring, mosaic, or hiding processing on the first interface.

5. The method of claim 1, wherein the second card comprises a content summary of each of the M notification messages.

6. The method of claim 1, wherein after displaying the M notification messages and making the first detection, the method further comprises:
    making, in response to the first detection, a fourth detection that the user enters a second swipe operation to the second card; and
    deleting, in response to the fourth detection, the second card and the M notification messages on the second card.

7. The method of claim 1, wherein after displaying the M notification messages and making the first detection, the method further comprises:
    making, in response to the first detection, a fourth detection that the user enters a third swipe operation to the second card;
    displaying, in response to the fourth detection and proximate to the second card, a management button for the message group;
    detecting that the user selects the management button; and
    displaying a management menu comprising one or more options configured to manage the message group.

8. The method of claim 1, wherein after displaying the M notification messages and making the first detection, the method further comprises:
    making, in response to the first detection, a fourth detection that the user enters a fourth swipe operation to the second card; and
    displaying, in response to the fourth detection, the N notification messages on corresponding N cards that are in a one-to-one correspondence with the N notification messages.

9. The method of claim 8, further comprising displaying, on each of the corresponding N cards, detailed content of a corresponding notification message.

10. The method of claim 9, wherein after displaying the N notification messages, the method further comprises:
    detecting that the user enters a fifth swipe operation to a third card in the corresponding N cards; and
    deleting the third card and a second notification message on the third card; or detecting that the user enters a sixth swipe operation to the third card, and displaying, proximate to the third card and in response to the sixth swipe operation, a management button for the second notification message.

11. The method of claim 1, further comprising obtaining, from a same application, the N notification messages.

12. An electronic device comprising:
    a touchscreen;
    a processor coupled to the touchscreen; and a memory coupled to the touchscreen and the processor and configured to store instructions, wherein when executed by the processor, the instructions cause the electronic device to:

display, on a first card, a first notification message in a message group, wherein the message group comprises N notification messages, and wherein other notification messages in the message group are hidden;

receive, from a user on the first card, a touch and hold operation;

display, on a second card in response to the touch and hold operation, M notification messages from the N notification messages, wherein the M notification messages comprise the first notification message, wherein 1<M≤N, and wherein both M and N are integers; and make a first detection that a finger of the user does not leave the touchscreen after performing the touch and hold operation, make, in response to the first detection, a second detection that the user enters a first swipe operation to the second card, and display, in a scrolling mode and in response to the second detection, the N notification messages on the second card; or make a third detection that the finger leaves the touchscreen after performing the touch and hold operation and redisplay, in response to the third detection, the first notification message on the first card.

13. The electronic device of claim 12, wherein when executed by the processor, the instructions further cause the electronic device to expand the first card to form the second card, and wherein the first card and the second card are located in a same interface.

14. The electronic device of claim 12, wherein when executed by the processor, the instructions further cause the electronic device to display the second card in a first interface in which the first card is located, and wherein a second interface in which the second card is located covers the first interface.

15. The electronic device of claim 12, wherein when executed by the processor, the instructions further cause the electronic device to perform blurring, mosaic, or hiding processing on the first interface.

16. The electronic device of claim 12, wherein the second card comprises a content summary of each of the M notification messages.

17. The electronic device of claim 12, wherein after displaying the M notification messages and making the first detection, when executed by the processor, the instructions further cause the electronic device to:

make, in response to the first detection, a fourth detection that the user enters a second swipe operation to the second card; and delete, in response to the fourth detection, the second card and the M notification messages on the second card.

18. The electronic device of claim 12, wherein after displaying the M notification messages and making the first detection, when executed by the processor, the instructions further cause the electronic device to:

make, in response to the first detection, a fourth detection that the user enters a third swipe operation to the second card;

display, in response to the fourth detection and proximate to the second card, a management button for the message group;

detect that the user selects the management button; and display a management menu comprising one or more options configured to manage the message group.

19. The electronic device of claim 12, wherein after displaying the M notification messages and making the first detection, when executed by the processor, the instructions further cause the electronic device to:

make, in response to the first detection, a fourth detection that the user enters a fourth swipe operation to the second card; and display, in response to the fourth detection, the N notification messages on corresponding N cards that are in a one-to-one correspondence with the N notification messages.

20. The electronic device of claim 19, wherein when executed by the processor, the instructions further cause the electronic device to display, on each of the corresponding N cards, detailed content of a corresponding notification message.

* * * * *